(12) United States Patent
Caldwell

(10) Patent No.: US 7,421,895 B1
(45) Date of Patent: Sep. 9, 2008

(54) FLUID LEVEL MEASURING SYSTEM

(76) Inventor: Joseph W. Caldwell, 7177 Four Rivers Rd., Boulder, CO (US) 80301

( * ) Notice: Subject to any disclaimer, the term of this patent is extended or adjusted under 35 U.S.C. 154(b) by 376 days.

(21) Appl. No.: 11/279,928

(22) Filed: Apr. 17, 2006

Related U.S. Application Data

(60) Provisional application No. 60/673,465, filed on Apr. 21, 2005.

(51) Int. Cl.
*G01F 23/00* (2006.01)
(52) U.S. Cl. .................................... 73/290 V
(58) Field of Classification Search ............... 73/290 V, 73/290 R
See application file for complete search history.

(56) References Cited

U.S. PATENT DOCUMENTS

| | | | |
|---|---|---|---|
| 2,668,365 A | | 2/1954 | Hogin |
| 4,170,765 A | * | 10/1979 | Austin et al. ................... 367/97 |
| 4,213,337 A | | 7/1980 | Langdon |
| 4,545,245 A | | 10/1985 | Sharp |
| 4,815,323 A | * | 3/1989 | Ellinger et al. ............ 73/290 V |
| 4,984,449 A | | 1/1991 | Caldwell et al. |
| 5,015,995 A | | 5/1991 | Holroyd |
| 5,309,763 A | | 5/1994 | Sinclair |
| 5,315,563 A | | 5/1994 | Lichtenfels, II et al. |
| 5,367,175 A | | 11/1994 | Bobb |
| 5,379,658 A | | 1/1995 | Lichtenfels, II et al. |
| 5,456,114 A | | 10/1995 | Liu et al. |
| 5,568,449 A | * | 10/1996 | Rountree et al. ............... 367/99 |
| 5,604,301 A | | 2/1997 | Mountford et al. |
| 5,673,587 A | | 10/1997 | Pfeifer |
| 5,693,881 A | | 12/1997 | Sitachitt et al. |
| 5,785,100 A | | 7/1998 | Showalter et al. |
| 5,793,705 A | | 8/1998 | Gazis et al. |
| 5,950,487 A | | 9/1999 | Maresca, Jr. et al. |
| 5,996,407 A | * | 12/1999 | Hewitt ....................... 73/290 V |
| 6,125,697 A | | 10/2000 | Holton et al. |
| 6,289,728 B1 | | 9/2001 | Wilkins |
| 6,546,794 B2 | | 4/2003 | Kim et al. |
| 6,588,269 B1 | | 7/2003 | Benghezal et al. |
| 6,598,474 B2 | | 7/2003 | Purpura et al. |
| 6,631,639 B1 | | 10/2003 | Dam et al. |
| 6,634,228 B2 | | 10/2003 | Deserno et al. |
| 6,650,280 B2 | * | 11/2003 | Arndt et al. .................. 342/124 |
| 6,672,156 B1 | | 1/2004 | Burns |

(Continued)

FOREIGN PATENT DOCUMENTS

JP    2000121410    4/2000

(Continued)

*Primary Examiner*—Hezron E. Williams
*Assistant Examiner*—Rodney T Frank
(74) *Attorney, Agent, or Firm*—Rick Martin; Patent Law Offices of Rick Martin, P.C.

(57) ABSTRACT

A fluid level measuring system comprising a fluid level sensor is disclosed. The fluid level sensor may comprise a top or bottom mounted transducer and limited openings to enable accurate measurement of a fluid's depth while the fluid is moving. The fluid level measuring system may be calibrated without the use of calibration reflectors and may be used to retrofit prior art fluid level measuring systems. A control system may be used to control the fluid level sensor and interface the fluid level sensor to an external subsystem, such as a fuel gauge.

21 Claims, 20 Drawing Sheets

U.S. PATENT DOCUMENTS

| | | |
|---|---|---|
| 6,925,870 B2 | 8/2005 | Pappas et al. |
| 6,951,131 B2 | 10/2005 | Sawert et al. |
| 6,993,967 B2 | 2/2006 | Forgue |
| 7,114,390 B2 * | 10/2006 | Lizon et al. ............... 73/290 V |
| 2005/0150291 A1 | 7/2005 | Voss |

FOREIGN PATENT DOCUMENTS

| | | |
|---|---|---|
| JP | 2002328056 | 11/2002 |
| JP | 2004037464 | 2/2004 |
| JP | 2004156949 | 6/2004 |

\* cited by examiner

FLUID LEVEL MEASURING SYSTEM

CROSS REFERENCE APPLICATIONS

This application is a non-provisional application claiming the benefits of provisional application No. 60/673,465 filed Apr. 21, 2005, the contents of which are herein incorporated by reference in its entirety.

BACKGROUND

There are many applications for devices and/or methods to measure the depth of a fluid. For example, it may be desirable to determine the level of liquid fuel in a fuel storage tank, such as the amount of gasoline or diesel fuel in an automobile or watercraft fuel tank. As another example, it may be desirable to determine the depth of water in a storage tank, a swimming pool, a lake, or a river.

Often, the fluid whose depth is to be measured is not static. For example, liquid fuel in an automobile or watercraft fuel tank may slosh around inside the fuel tank in response to movement of the automobile or watercraft. As another example, there may be waves on the surface of a lake.

There are a number of traditional techniques of measuring a fluid's depth. One technique is to use a float/sending unit combination. The float, which floats on the fluid's surface, is connected via a member, such as a rod, to a fixed swivel point on the sending unit. The swivel point is in turn connected to a variable resistor within the sending unit. The resistance of the variable resistor varies in response to a change in the position of the swivel point. Because the float rests on the fluid's surface, the float moves vertically in response to a change in the fluid's depth. The change in the float's vertical position is transferred to the sending unit's variable resistor via the member and the swivel point. Consequently, the variable resistor's resistance changes in response to a change in the fluid's depth. An indicator subsystem, such as an electrically operated fuel gauge, may be connected to the variable resistor and indicate to a user the fluid's current depth.

The float/sending unit combination suffers from a number of disadvantages. First, movement of the fluid to be measured may result in inaccurate measurements. For example, if a watercraft is moving rapidly through water, fuel in its fuel tank may slosh around inside the fuel tank. If the fuel level is measured via a float/sending unit combination, the float may move in response to sloshing of the fuel in the fuel tank. Consequently, the float/sending unit combination may provide an inaccurate fuel level measurement when the watercraft is moving.

A second disadvantage of the float/sending unit combination is that a person generally must manually adjust the member's length and/or arc in order to calibrate the float/sending unit combination. The float/sending unit combination may be located in an area that is difficult to access, such as in a vehicle's fuel tank. Thus, it may be difficult and/or inconvenient to calibrate the float/sending unit combination. Additionally, movement of the fluid to be measured may exert force on the float/sending unit combination and knock it out of calibration.

Finally, because the float moves in response to a change in fluid depth, the float/sending unit combination must comprise moving parts. A system having moving parts may wear out more quickly than a system not having moving parts. Movement of the fluid to be measured may exert a force on the moving parts, which may accelerate their failure. Additionally, the intended movement of the parts may be impaired by contaminants in the fluid to be measured.

One prior art alternative to the float/sending unit combination is an ultrasonic fluid depth measuring system. Such system comprises a transducer which converts an electrical signal to an ultrasonic wave and vice versa. Such system typically operates by injecting an ultrasonic wave towards the fluid's surface via the transducer. A portion of the ultrasonic wave is reflected by the fluid's surface back towards the transducer. The transducer captures the ultrasonic wave reflected by the fluid's surface. By measuring the amount of time that elapsed between when the transducer injected the ultrasonic wave and when the transducer captured the reflected ultrasonic wave, the system can determine the fluid's depth. Such method of measuring a fluid's depth may be referred to as the pulse-echo technique.

In order to accurately determine a fluid's depth by using an ultrasonic fluid depth measuring system, the speed of the ultrasonic wave in the medium through which it travels (e.g. liquid or air) must be known. Typically, one or more calibration reflectors are placed a known distance away from the transducer. By measuring the amount of time it takes for an ultrasonic wave injected by the transducer to be reflected by a calibration reflector and returned to the transducer, the speed of the ultrasonic wave in the medium through which it travels may be estimated.

Although calibration reflectors may generally provide an accurate method of calibrating an ultrasonic fluid depth measuring system, they may increase cost and/or manufacturing complexity of the system. Additionally, use of calibration reflectors may result in false readings when the liquid to be measured is moving. In applications where accurate fluid level depth measures are critical (e.g. watercraft or aircraft fuel level measurements), inaccurate liquid level depth measurements may result in property damage, injury, or death.

As noted above, it is frequently desirable to measure the depth of a fluid that is moving, such as the depth of fuel in a moving vehicle's fuel tank. Some prior art fluid depth measuring apparatuses, such as the float/sending unit combination, may not provide an accurate fluid depth measurement while the fluid is moving. Other prior art fluid depth measuring apparatuses, such as prior art ultrasonic fluid depth measuring systems, may be unacceptably costly and/or complex. Consequently, what is needed is a fluid level measuring system that may provide accurate measurements when the fluid is moving, that is of relatively low cost and easy to manufacture, that may be used to retrofit an existing fluid level measuring system, and that is simple to calibrate.

SUMMARY

A fluid level measuring system and methods of measuring the depth of a fluid are disclosed. The term fluid includes, but is not limited to, a pure liquid, a non-pure liquid, and/or a liquid comprising suspended particles. The fluid level measuring system may comprise a generally closed structure intended to be inserted into the fluid whose depth is to be measured. The structure may contain limited openings or sensor ports which allow fluid to enter and exit the structure while minimizing the effect of movement of the fluid around the fluid level measuring system.

A transducer may be located near the bottom or the top of the structure. The transducer may inject a wave into the structure and the transducer may capture a wave that is reflected off the fluid's surface. The fluid's depth may be determined from the time elapsed between when the transducer injects a wave into the structure and when the transducer captures a wave reflected from the fluid's surface.

The fluid level measuring system may be calibrated without the use of calibration rods or reflectors. The fluid level measuring system may be used to retrofit an existing prior art fluid depth measuring system, such as a float/sending unit based system in a watercraft or a recreational vehicle. The fluid level measuring system may be adapted for use in systems of varying electrical voltage. The fluid level measuring system may interface with other systems to exchange data.

These and other features and advantages of the fluid level measuring system reside in the construction of parts and the combination thereof, the mode of operation and use, as will become more apparent from the following description, reference being made to the accompanying drawings that form a part of this specification wherein like reference characters designate corresponding parts in the several views. The embodiments and features thereof are described and illustrated in conjunction with systems, tools and methods which are meant to exemplify and to illustrate, not being limiting in scope.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
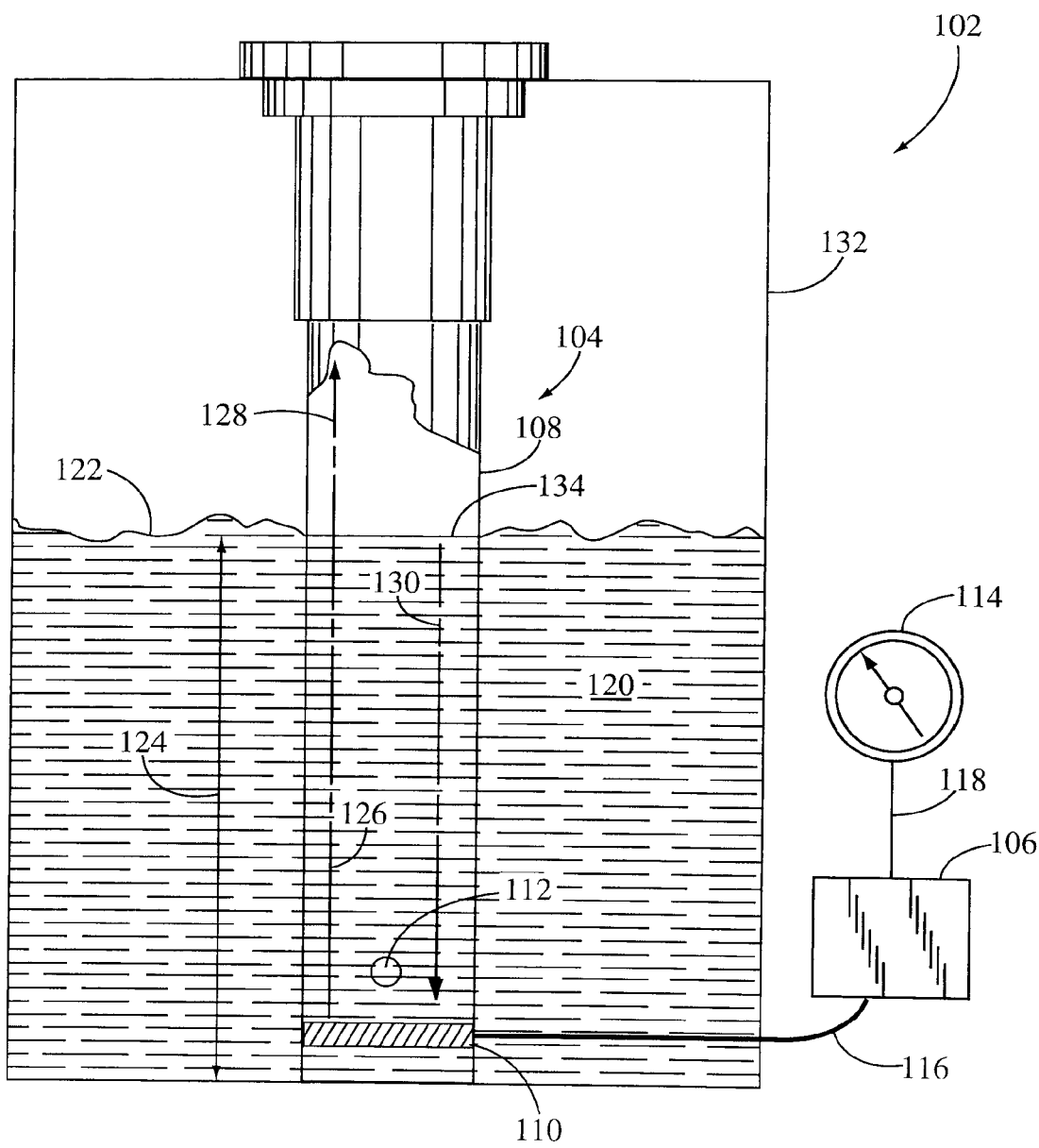
FIG. 1 is a simplified partial cross sectional side view of an embodiment of a fluid level measuring system.

FIG. 1 is a simplified partial cross sectional side view of an embodiment of a fluid level measuring system. The embodiment of FIG. 1 will hereinafter be referred to as system 102. System 102 comprises "bottom up" fluid level sensor 104 and control system 106. Although FIG. 1 shows control system 106 as a stand alone subsystem connected to fluid level sensor 104 via cable 116, control system 106 could be integrated within fluid level sensor 104.

By way of example and not of limitation, system 102 may be installed in vessel 132 to measure depth 124 of fluid 120 in vessel 132. It is to be understood that system 102 may also be used to measure the depth of a relatively open body of fluid, such as a lake or a stream.

Fluid level sensor 104 may comprise sensor body or stillwell 108, which may be in the shape of a cylinder, with one or more openings or sensor ports 112. Stillwell 108, with one or more sensor ports 112, provides a sheltered environment for measurement of depth 124 of fluid 120. Movement of fluid 120, such as waves on surface 122 of fluid 120, is damped within stillwell 108. Consequently, system 102 may even provide accurate depth 124 measurements when fluid 120 is moving.

One or more sensor ports 112 allow fluid to enter and exit stillwell 108. Additionally, an opening (not shown) in stillwell 108 may be located near the top of stillwell 108 to allow air to enter or exit stillwell 108. Because the pressure within stillwell 108 will equal the pressure outside of stillwell 108 under steady state conditions, the fluid depth within stillwell 108 will be the same as fluid depth 124 outside stillwell 108 under steady state conditions.

Sensor ports 112 may be used to damp motion of fluid within stillwell 108 in order to facilitate accurate measurements of fluid depth 124 when fluid 120 is moving. Sensor ports 112 accomplish such damping by providing a restricted path for fluid to enter and exit stillwell 108. Such restricted path slows the entry and exit of fluid to and from stillwell 108 and thereby reduces the effect of movement of fluid outside stillwell 108 on fluid inside stillwell 108. The amount of damping provided by sensor ports 112 is inversely proportional to the ratio of the sum of diameters of the one or more sensor ports 112 to the diameter of stillwell 108. The restricted path provided by sensor ports 112 also prevents any foam that might by present on fluid surface 122 from entering stillwell 108.

A float ball (not shown) may be included within stillwell 108. The float ball, which may be round, enables system 102 to operate when fluid level sensor 104 is not perpendicular to fluid surface 122. The float ball, which will float on fluid surface 134 within stillwell 108, serves to reflect a wave injected into stillwell 108 by transducer 110.

Because fluid level sensor 104 is a bottom up fluid level sensor, transducer 110 is located at or near the bottom of stillwell 108. Control system 106 may be connected to transducer 110 via cable 116. Alternately, control system 106 may be integrated within fluid level sensor 104.

By way of example and not of limitation, system 102 may operate as follows. Control system 106 generates an electric excitation signal at a certain frequency. By way of example and not of limitation, the excitation signal may have a duration ranging from 2 to 500 microseconds. The excitation signal is transmitted from control system 106 to transducer 110 via cable 116 or another conductor. Transducer 110 responds to the excitation signal by generating wave 126 of a frequency corresponding to the frequency of the excitation signal. Wave 126 travels through the fluid within stillwell 108 until it intersects fluid surface 134. A portion of wave 126 continues to travel through stillwell 108 above fluid surface 134 as wave 128. The remainder of wave 126 is reflected by fluid surface 134 back towards transducer 110 as wave 130. When wave 130 intersects transducer 110, transducer 110 generates a corresponding electric return signal. The electric return signal corresponding to wave 130 is transmitted to control system 106 via cable 116 or another conductor.

Control system 106 determines the time that elapsed between when it generated an excitation signal and when it received a return signal. Because this elapsed time is proportional to depth 124 of fluid 120, the elapsed time may be used to calculate depth 124 of fluid 120. System 102 may include level gauge 114 connected to control system 106 via cable 118. Depth 124 of fluid 120 may be displayed on level gauge 114.

Level gauge 114 may be any indicator which may display the depth of fluid 124. By way of example and not of limitation, level gauge 114 may be an electric fuel gauge comprising indicators that indicate when a fuel tank is one quarter full, one half full, or three quarters full.

In the event tank 132 is not rectangular, fluid depth 124 may not represent the portion of tank 132 that is full. In this case, control system 106 may correlate fluid depth 124 to the portion of tank 132 that is full such that level gauge 114 indicates the portion of tank 132 that is full.

Figure 2:
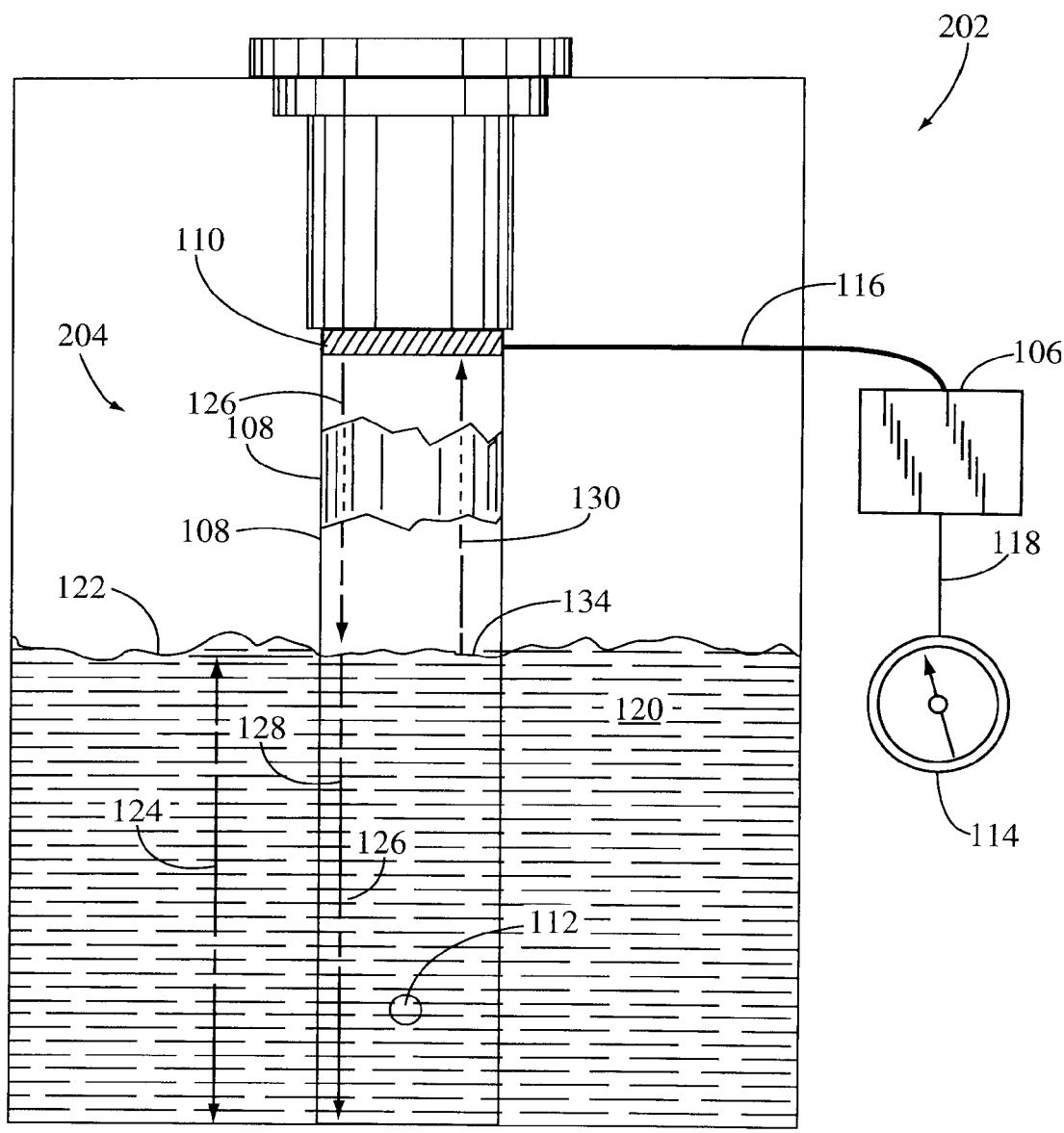
FIG. 2 is a simplified partial cross sectional side view of an embodiment of a fluid level measuring system.

FIG. 2 is a simplified partial cross sectional side view of an embodiment of a fluid level measuring system. The embodiment of FIG. 2 will hereinafter be referred to as system 202. System 202 is essentially identical to system 102 of FIG. 1 with the exception that system 202 comprises top down fluid level sensor 204 instead of bottom up fluid level sensor 104. Top down fluid level sensor 204 is essentially the same as bottom up fluid level sensor 104 with the exception that transducer 110 is located near the top of sensor body or stillwell 108 in top down fluid level sensor 204. Although FIG. 2 shows control system 106 as a stand alone subsystem connected to fluid level sensor 204 via cable 116, control system 106 could be integrated within fluid level sensor 204.

By way of example and not of limitation, system 202 may operate as follows. Control system 106 generates an electric excitation signal at a certain frequency. By way of example and not of limitation, the excitation signal may have a duration ranging from 2 to 500 microseconds. The excitation signal is transmitted to transducer 110 via cable 116 or another conductor. Transducer 110 responds to the excitation signal by generating wave 126 of the same frequency as that of the excitation signal. Wave 126 travels downward through the air within stillwell 108 until it intersects fluid surface 134. A portion of wave 126 continues to travel through stillwell 108 below fluid surface 134 as wave 128. The remainder of wave 126 is reflected back towards transducer 110 as wave 130. When wave 130 intersects transducer 110, transducer 110 generates a corresponding electric return signal. The electric return signal corresponding to wave 130 is transmitted to control system 106 via cable 116 or another conductor.

As in system 102 of FIG. 1, control system 106 determines the time elapsed between when it generated an excitation signal and when it received a return signal. Because this elapsed time is inversely proportional to depth 124 of fluid 120, the elapsed time may be used to calculate depth 124 of fluid 120. System 202 may include level gauge 114 connected to control system 106 via cable 118. Depth 124 of fluid 120 may be displayed on level gauge 114.

In the event tank 132 is not rectangular, fluid depth 124 may not represent the portion of tank 132 that is full. In this case, control system 106 may correlate fluid depth 124 to the portion of tank 132 that is full such that level gauge 114 indicates the portion of tank 132 that is full.

Figure 3:
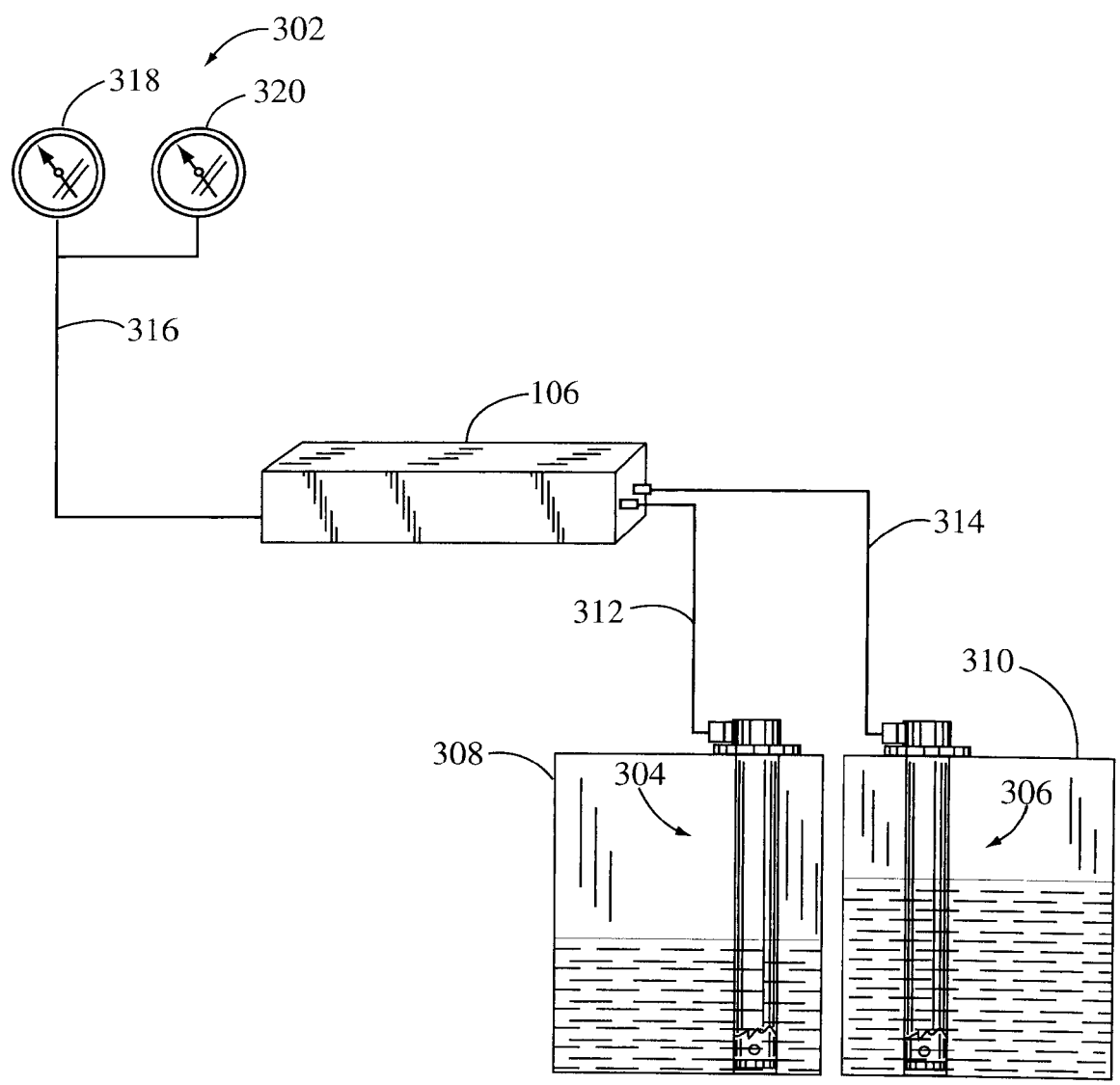
FIG. 3 is a simplified partial cross sectional side view of an embodiment of a fluid level measuring system.

Embodiments of fluid level measuring systems may comprise a plurality of one or more elements from fluid level measuring systems 102 and 202 of FIGS. 1 and 2 respectively. For example, FIG. 3 shows a simplified partial cross sectional side view of an embodiment of a fluid level measuring system. The embodiment of FIG. 3 will hereinafter be referred to as system 302. System 302 comprises two fluid level sensors, 304 and 306, as well as two fluid level gauges 318, and 320. Fluid level sensor 304 may consist of a bottom up or a top down fluid level sensor, such as fluid level sensor 104 of FIG. 1 or fluid level sensor 204 of FIG. 2. Fluid level sensor 306 may consist of a bottom up or a top down fluid level sensor, such as fluid level sensor 104 of FIG. 1 or fluid level sensor 204 of FIG. 2.

System 302 may be used to simultaneously measure and display the depth of fluid in vessels 308 and 310. Fluid level gauge 318 may be used to display the depth of fluid in vessel 308, and fluid level gauge 320 may be used to display the depth of fluid in vessel 310. Control system 106 may provide an excitation signal to transducers located within fluid level sensors 304 and 306 via cables 312 and 314 respectively. Control system 106 may receive electric return signals from fluid level sensors 304 and 306 via cables 312 and 314 respectively. Fluid level gauges 318 and 320 may be connected to control system 106 via cable 316.

As described above, the fluid level measuring systems comprising fluid level sensors 104 and 204 determine the depth of the fluid to be measured based on the time required for a wave injected into the fluid level sensor to travel from the transducer to the fluid surface and then back to the transducer. Such time will henceforth be referred to as the "Travel Time". Fluid depth can be estimated from the Travel Time because the Travel Time is directly proportional to the distance between the transducer and the fluid surface.

However, before the distance between the transducer and the fluid surface can be calculated from the Travel Time, the amount of time required for a wave to travel a known distance within the fluid level sensor must be known. This time will be henceforth referred to as the "Reference Time". The known distance corresponding to the Reference Time is typically a round trip distance between the transducer and a reference point within the fluid level sensor. Because the reference point is a known distance from the transducer, the distance from the fluid surface to the transducer may be determined by comparing the Travel Time to the Reference Time. Thus, before fluid level measuring systems comprising fluid level sensors 104 and 204 can be used, a Reference Time must be determined. The process of determining a Reference Time is referred to as calibrating the fluid level measuring system.

As noted above, prior art ultrasonic fluid depth measuring systems are typically calibrated from one or more calibration reflectors placed at one or more reference points. However, fluid level measuring systems comprising fluid level sensors 104 and 204 may be calibrated without the use of calibration reflectors.

Figure 4A:
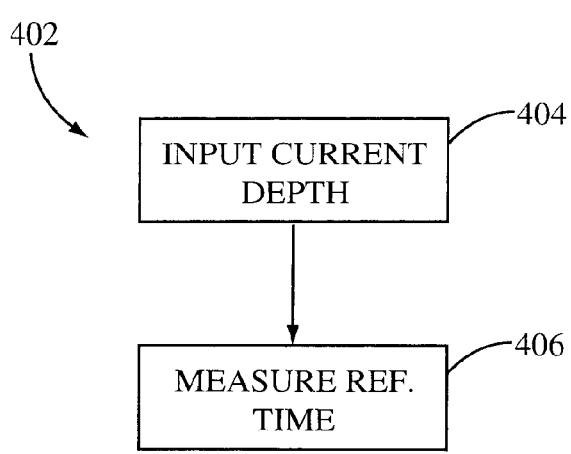
FIG. 4A is a flow chart of a calibration process.

FIG. 4A is a flow chart of a calibration process. Calibration process 402 may be used to calibrate fluid level measurement systems comprising fluid level sensors 104 and 204.

Calibration process 402 begins with step 404 wherein a user inputs into control system 106 the current depth of the fluid to be measured ("Current Depth"). For example, the Current Depth may consist of the amount of fuel in a fuel tank or the depth of water in a lake. The user may determine the Current Depth through any acceptable method, including but not limited to, using a measuring scale to measure the Current Depth, or equating the Current Depth to a known quantity of fluid that was introduced into the receptacle that houses the fluid when the receptacle was empty. The Current Depth is used as the reference point for determining the Reference Time.

Figure 5:
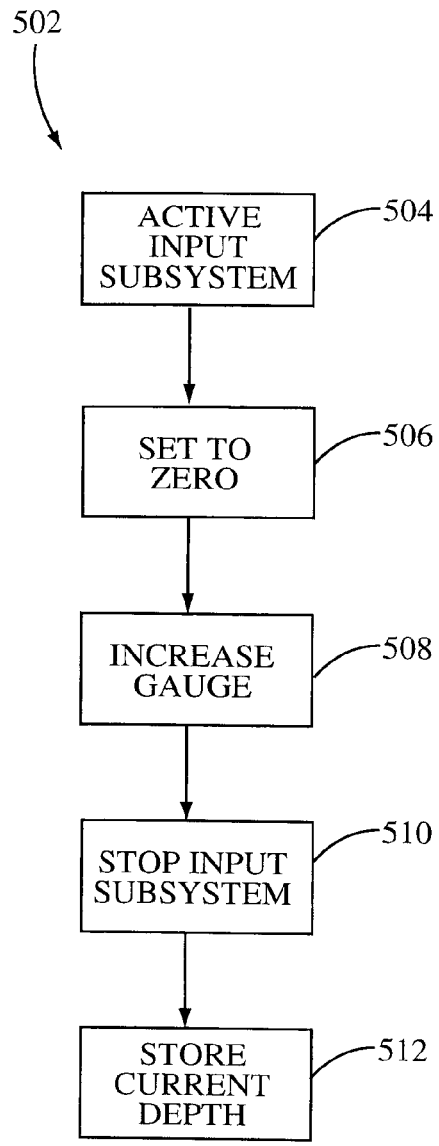
FIG. 5 is a flow chart of a method of inputting a fluid depth value into a control system.

The user may input the Current Depth into control system 106 by any acceptable method. FIG. 5 is a flow chart of input method 502, which is one possible method by which a user may input the Current Depth into control system 106. Method 502 begins with step 504 wherein a user activates an input subsystem within control system 106. The input subsystem then sets the level indicated by a fluid level gauge to zero in step 506. Next, the input subsystem increases the level indicated by the fluid level gauge in step 508 until stopped by the user in step 510 when the fluid level gauge indicates the Current Depth. Control system 106 then stores the amount of fluid indicated by the fluid level gauge as the Current Depth in step 512.

Once the Current Depth has been inputted into control system 106, calibration process 402 proceeds to step 406. In step 406, the amount of time it takes for a waveform injected by the transducer to travel from the transducer to the reference point (i.e. fluid surface) and back to the transducer is measured. This amount of time corresponds to the Reference Time associated with the reference point or Current Depth.

Control system 106 may store the Reference Time associated with the Current Depth by any suitable method for future use. For example, control system 106 may extrapolate the Reference Time associated with the Current Depth to create a lookup table of fluid depths associated with various Travel Times. As another example, control system 106 may use the Reference Time associated with the Current Depth to calculate the speed of an injected wave through the medium between the transducer and the fluid surface (e.g. fluid or air). Control system 106 may then use the calculated speed to determine a fluid depth from a measured Travel Time.

Figure 4B:
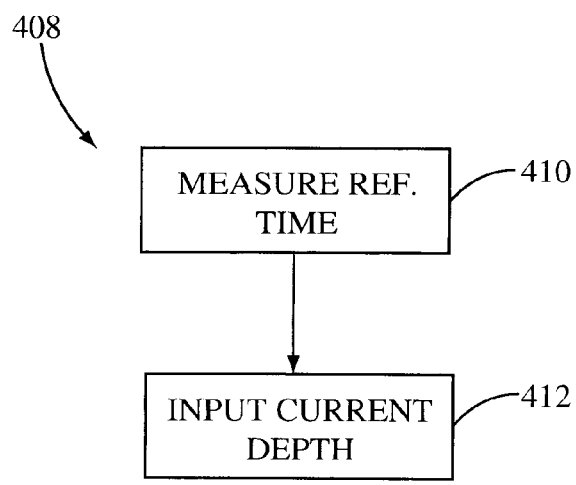
FIG. 4B is a flow chart of a calibration process.

FIG. 4B is a flow chart of alternative calibration process 408. Calibration process 408 operates in the same manner as calibration process 402 with the exception that the Reference Time associated with the Current Depth is determined in step 410 before the user inputs the Current Depth in step 412.

As described above, fluid level measuring systems comprising fluid level sensors 104 and 204 may provide accurate fluid depth measurements even when the fluid to be measured is in motion. Consequently, such fluid level measuring systems may be well suited for use in retrofitting fluid level measuring systems in dynamic applications, such as fuel level measurement systems in watercrafts or recreational vehicles.

Figure 6:
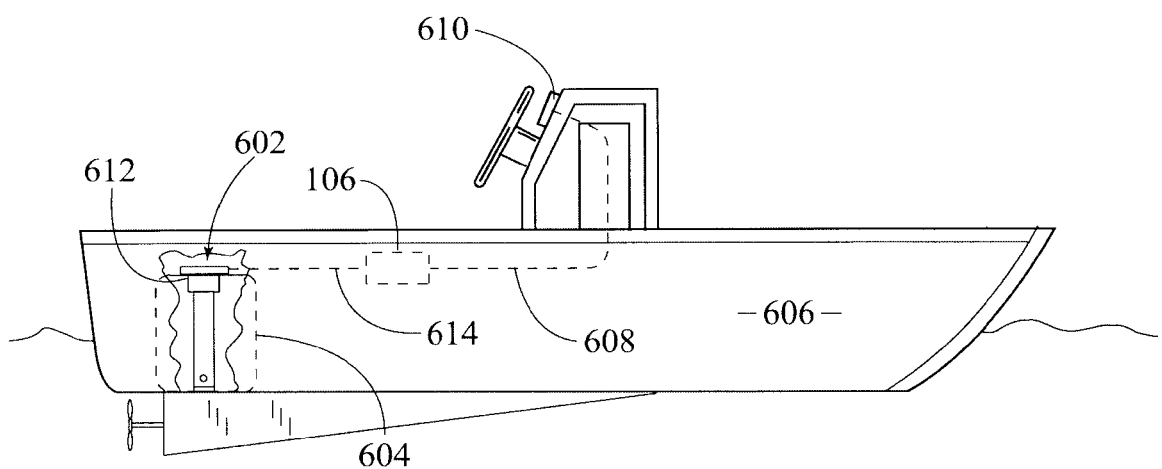
FIG. 6 is a partial cross sectional side view of a watercraft fuel measurement system that has been retrofitted with a fluid level measuring system.

FIG. 6 is a partial cross sectional side view of a fuel measurement system of watercraft 606 that has been retrofitted by using fluid level sensor 602 as a substitute for a float/sending unit. Fluid level sensor 602 may consist of bottom up fluid level sensor 104 or top down fluid level sensor 204.

The retrofit of FIG. 6 may be conducted as follows. The float/sending unit (not shown), is removed from fuel tank 604. Cable 608, which connects fluid level gauge 610 to the float/sending unit, is disconnected from the float/sending unit. Fluid level sensor 602 is inserted into fuel tank 604 via opening 612 through which the float/sending unit was previously inserted into fuel tank 604. Fluid level sensor 602 is secured to the top of fuel tank 604 by use of sensor cap securing screws.

Control system 106 is connected to cable 608. Cable 614 is used to connect fluid level sensor 602 to control system 106.

The port of control system 106 which is connected to cable 608 emulates a variable resistor whose resistance varies in response to a change in depth of fuel in fuel tank 604. Because the output of the float/sending unit also comprises a variable resistor, no changes need to be made to fluid level gauge 610 or its associated subsystems when replacing the float/sending unit with fluid level sensor 602.

Figure 7:
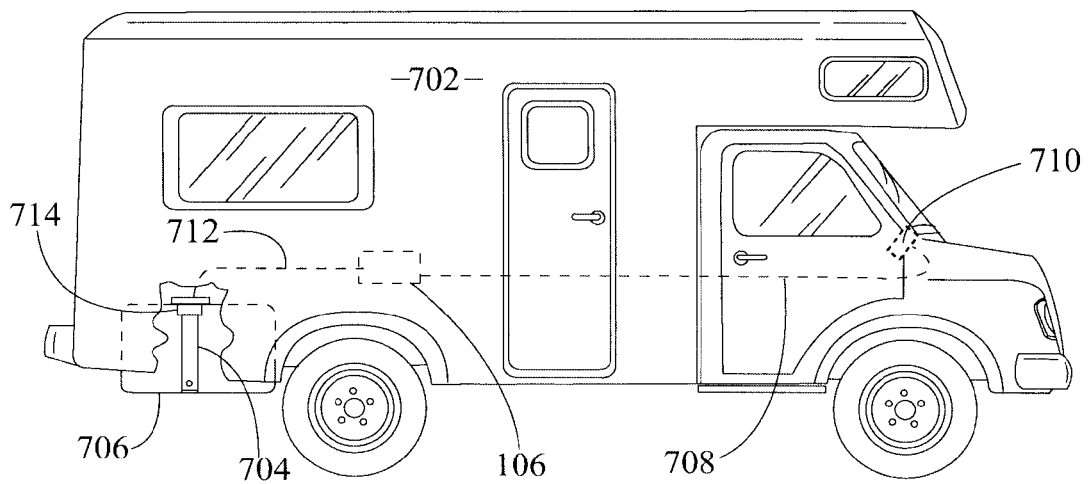
FIG. 7 is a partial cross sectional side view of a recreational vehicle fuel measurement system that has been retrofitted with a fluid level measuring system.

FIG. 7 shows a partial cross sectional side view of a recreational vehicle fuel measurement system that has been retrofitted with a fluid level sensor. Recreational vehicle 702 comprises fuel tank 706 which originally used a float/sending unit (not shown) to measure the level of fuel in fuel tank 706. Fluid level sensor 704 may consist of bottom up fluid level sensor 104 or top down fluid level sensor 204.

The retrofit of FIG. 7 may be conducted as follows. The float/sending unit is removed from fuel tank 706. Cable 708, which connects fluid level gauge 710 to the float/sending unit, is disconnected from the float/sending unit. Fluid level sensor 704 is inserted into fuel tank 706 via opening 714 through which the float/sending unit was previously inserted into fuel tank 706. Fluid level sensor 704 is secured to the top of fuel tank 706 by use of sensor cap securing screws.

Control system 106 is connected to cable 708. Cable 712 is used to connect fluid level sensor 704 to control system 106.

The port of control system 106 which is connected to cable 708 emulates a variable resistor whose resistance varies in response to a change in depth of fuel in fuel tank 706. Because the output of the float/sending unit also comprises a variable resistor, no changes need to be made to fluid level gauge 710 or its associated subsystems when replacing the float/sending unit with fluid level sensor 704.

Figure 8A:
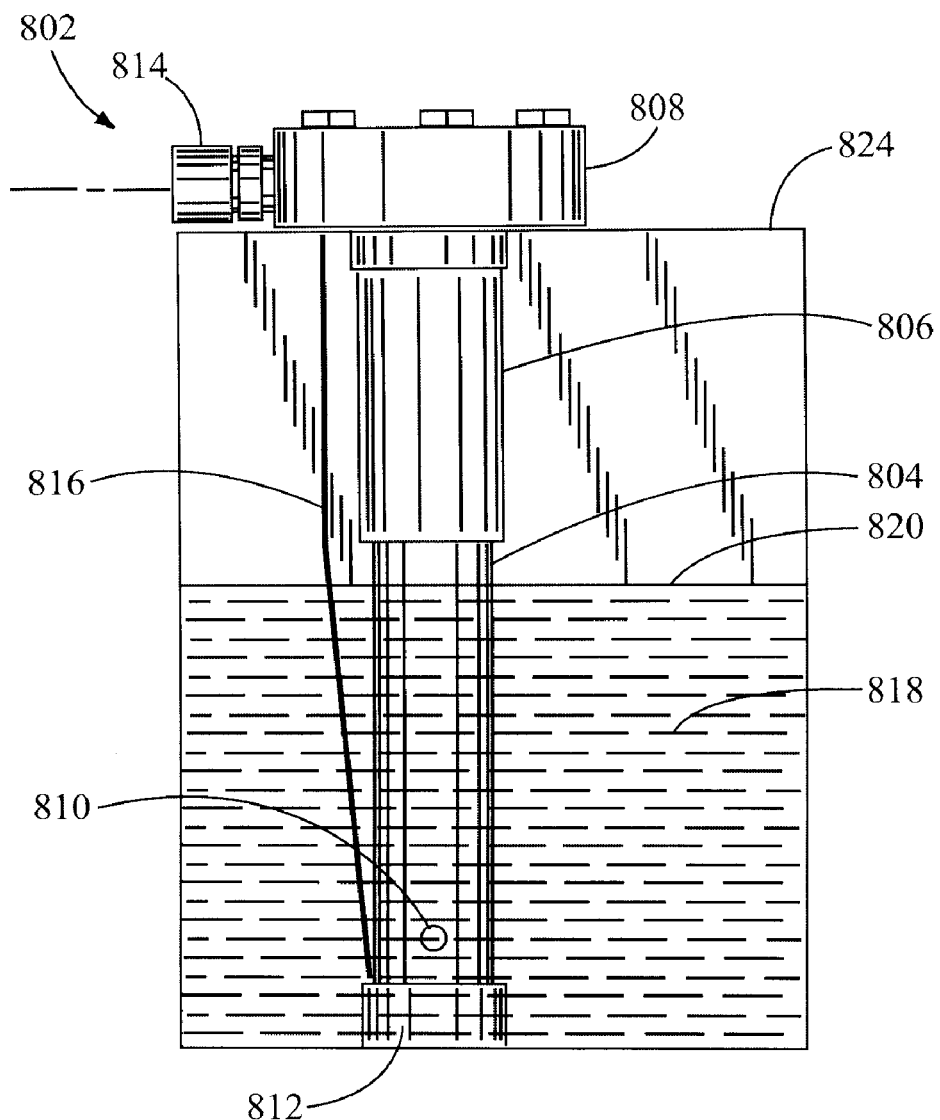
FIG. 8A is a side plan view of an embodiment of a fluid level sensor.

FIG. 8A is a side plan view of an embodiment of a fluid level sensor. By way of example, fluid level sensor 802 is shown installed in tank 824 comprising fluid 818 with surface 820. It is to be understood that fluid level sensor 802 need not be installed in a tank. Tank 824 is shown in a cross sectional manner so that fluid level sensor 802 is visible.

Fluid level sensor 802 comprises stillwell 804, which may be a hollow tube constructed of a material that will not react with the fluid to be measured. For example, stillwell 804 may be constructed of aluminum, brass, nylon, or plastic. Stillwell 804 may vertically extend the entire depth of fluid to be measured. For example, stillwell 804 may extend from the bottom to the top of tank 824. The diameter of stillwell 804 may be sized to accommodate a selected transducer. For example, if fluid level sensor 802 is to be used to measure the depth of a relatively deep body of fluid, the diameter of stillwell 804 may be increased to allow the use of a larger, more powerful transducer.

Fluid level sensor 802 comprises sensor port 810 which allows fluid to enter and exit stillwell 804. Fluid level sensor 802 may comprise transducer housing 812 located at the bottom of stillwell 804. (Other embodiments of fluid level sensor 802 may comprise transducer housing 812 located near the top of stillwell 804.) Transducer housing 812, which may be made of a material that does not react to the fluid to be measured, may have a cork backing. Sensor wiring 816 may enter transducer housing 812 and connect to transducer 110 (shown in FIG. 8C) located within sensor housing 812. The interior of transducer housing 812 may be potted with a substance that is not reactive to the fluid to be measured. The potting substance may also be used to secure sensor transducer housing 812 to the bottom of stillwell 804.

Sensor collar 806 may be placed around the top of stillwell 804. Sensor collar 806 may provide an interface between stillwell 804 and sensor cap 808. Additionally, sensor collar 806 may allow fluid level sensor 802 to have a variable length. Sensor collar 806 will be described in more detail below.

Sensor cap 808 may be attached to sensor collar 806. Sensor cap 808 may serve to secure fluid level sensor 802 relative to the body of fluid to be measured. For example, sensor cap 808 may be used to secure fluid level sensor 802 in tank 824 and provide a tight liquid seal at the location where fluid level sensor 802 is installed in tank 824. Sensor cap 808 may also serve to secure sensor wiring 816 via cord grip 814. Sensor cap 808 may be constructed of a material that does not react to the fluid to be measured.

Figure 8B:
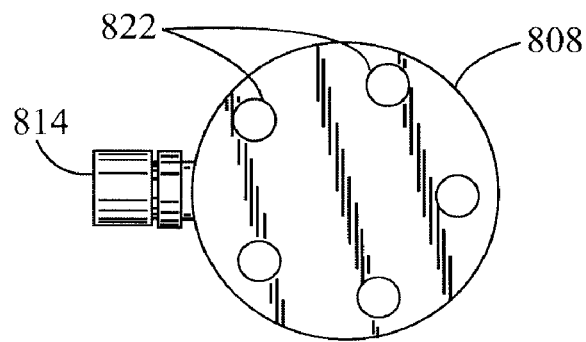
FIG. 8B is a top plan view of the sensor cap of the fluid level sensor of FIG. 8A.

FIG. 8B is a top plan view of sensor cap 808. Sensor cap 808 may comprise sensor cap securing screws 822. Securing screws 822 may be arranged in a SAE pattern (5.398 centimeter (2.125 inch) diameter circle for five #10 screws). Additional information regarding the SAE fuel level indicator mounting pattern may be found in FIG. 9. Also visible in FIG. 8B is cord grip 814.

Figure 8C:
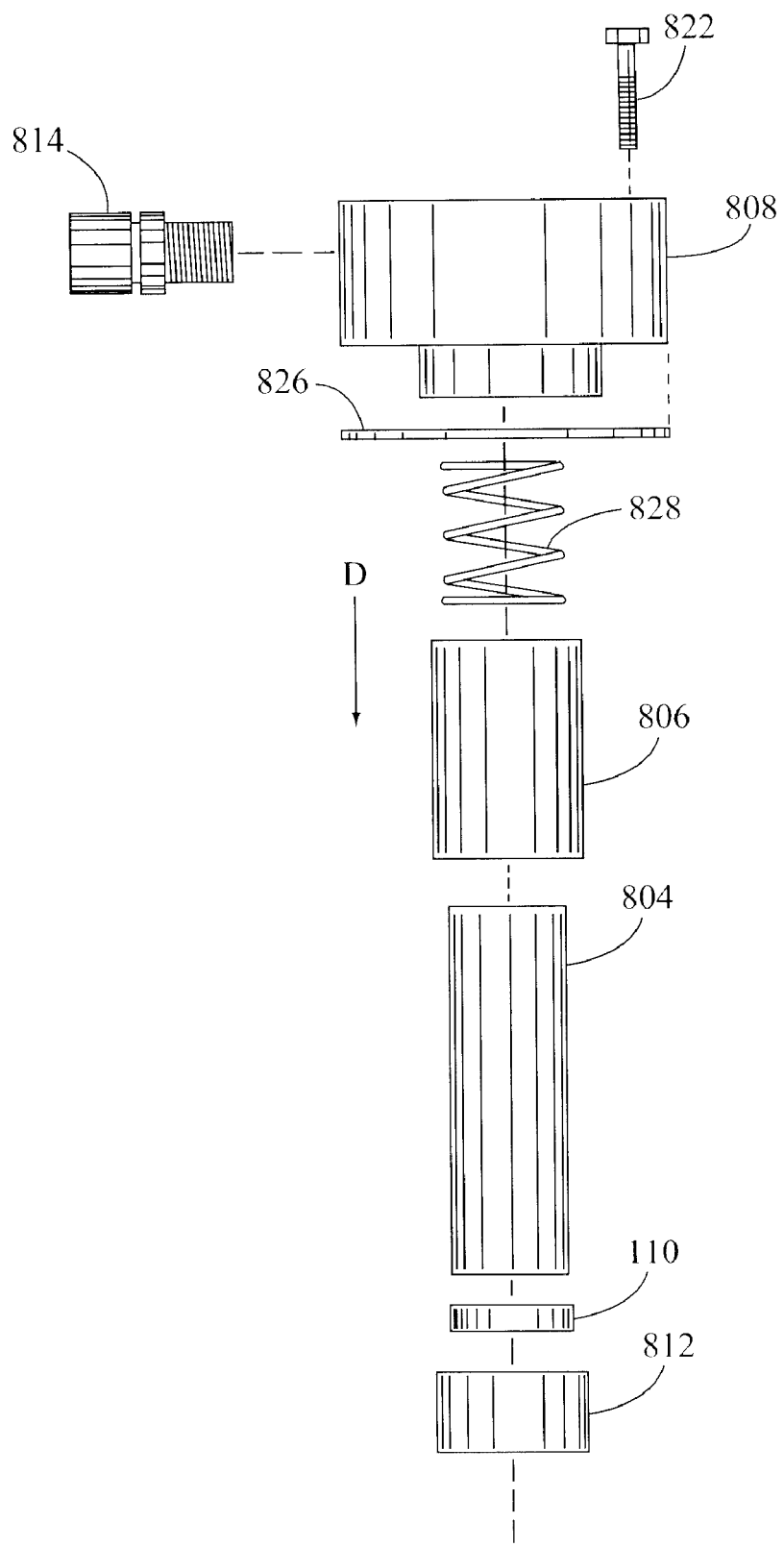
FIG. 8C is an exploded side plan view of the fluid level sensor of FIG. 8A.

FIG. 8C is an exploded side plan view of fluid level sensor 802. Sealing gasket 826 may be located between sensor cap 808 and sensor collar 806 to provide a tight seal between sensor cap 808 and sensor collar 806.

Sensor collar spring 828 may be sized such that sensor collar spring 828 will not slide into stillwell 804. Sensor collar spring 828 may be used to allow stillwell 804 to move in a vertical direction within sensor collar 806. Thus, the overall length of fluid level sensor 802 may be adjusted to accommodate the requirements of various applications. For example, a given fluid level sensor 802 may accommodate fuel tanks of various heights. Sensor collar spring 828 may also allow fluid level sensor 802 to adapt to changes in the height of a vessel that it is installed in. For example, sensor collar spring 828 may allow fluid level sensor 802 to accommodate flexing of a fuel tank that it is installed in.

Sensor collar spring 828 may also serve to provide force in direction D on stillwell 804 and transducer housing 812. Such force may insure that fluid level sensor 802 rests on the bottom of the receptacle housing the fluid to be measured. For example, sensor collar spring 828 may serve to insure that fluid level sensor 802 rests on the bottom of tank 824 as shown in FIG. 8A. Also shown in FIG. 8C are elements including cord grip 814, securing screw 822, and transducer 110.

Figure 8D:
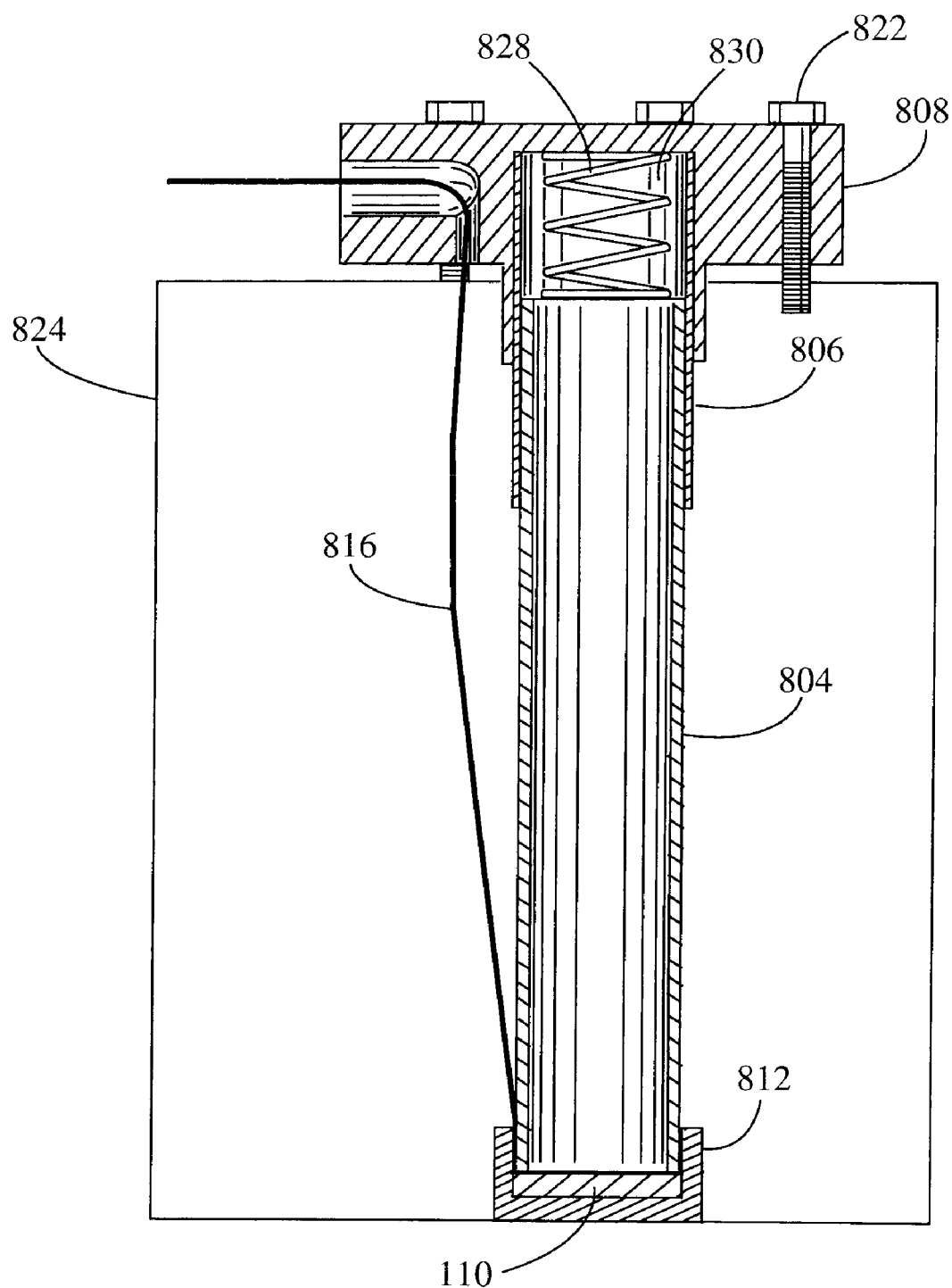
FIG. 8D is a cross sectional side view of the fluid level sensor of FIG. 8A.

FIG. 8D is a cross sectional side view of fluid level sensor 802. Sensor collar spring 828 is located above stillwell 804 in recess 830 of sensor cap 808. The top of stillwell 804 is located within sensor collar 806. Sensor collar 806 allows stillwell 804 to move vertically within sensor collar 806. Also visible in FIG. 8D are elements including sensor cap securing screw 822, sensor wiring 816, tank 824, transducer housing 812, and transducer 110.

Figure 9:
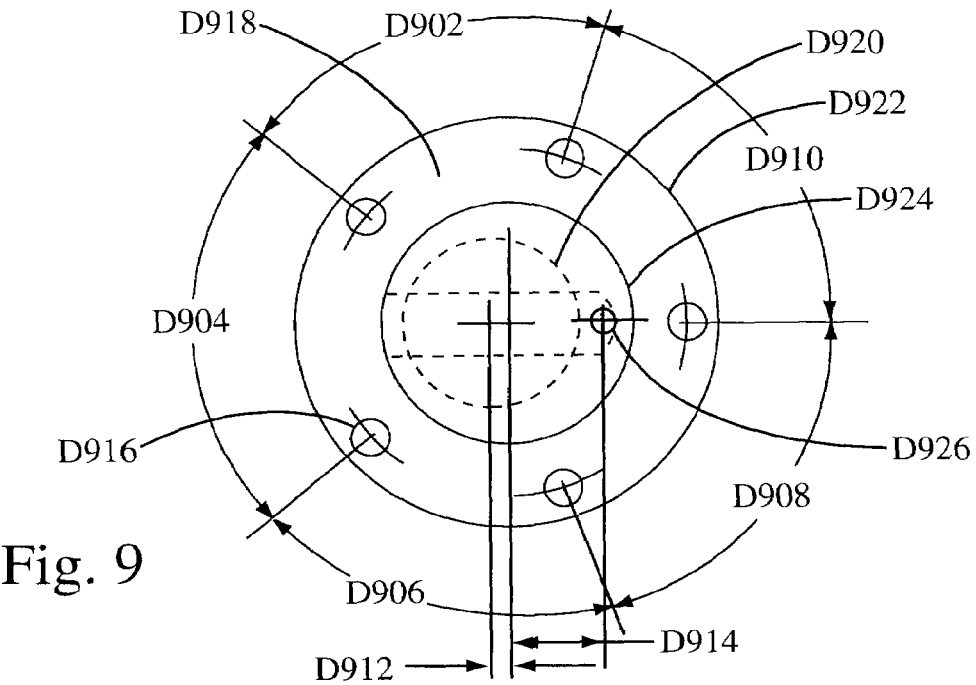
FIG. 9 is a mechanical drawing of the top of a SAE fuel level indicator mounting pattern.

FIG. 9 is a mechanical drawing of the top of the SAE fuel level indicator mounting pattern which is commonly found on boat fuel tanks. By way of example and not of limitation, the dimensions of FIG. 9 may be as follows: D902=68 degrees, D904=80 degrees, D906=68 degrees, D908=72 degrees, D910=72 degrees, D912=0.305 centimeter (0.12 inch), D914=1.448 centimeters (0.57 inch), D916=0.551 centimeter (0.217 inch) diameter, D918=5.398 centimeters (2.125 inches) diameter, D920=2.667 centimeters (1.05 inches) diameter, D922=6.35 centimeters (2.50 inches) diameter, D924=3.759 centimeters (1.48 inches) diameter, and D926=0.381 centimeters (0.15 inches) diameter.

Figure 10:
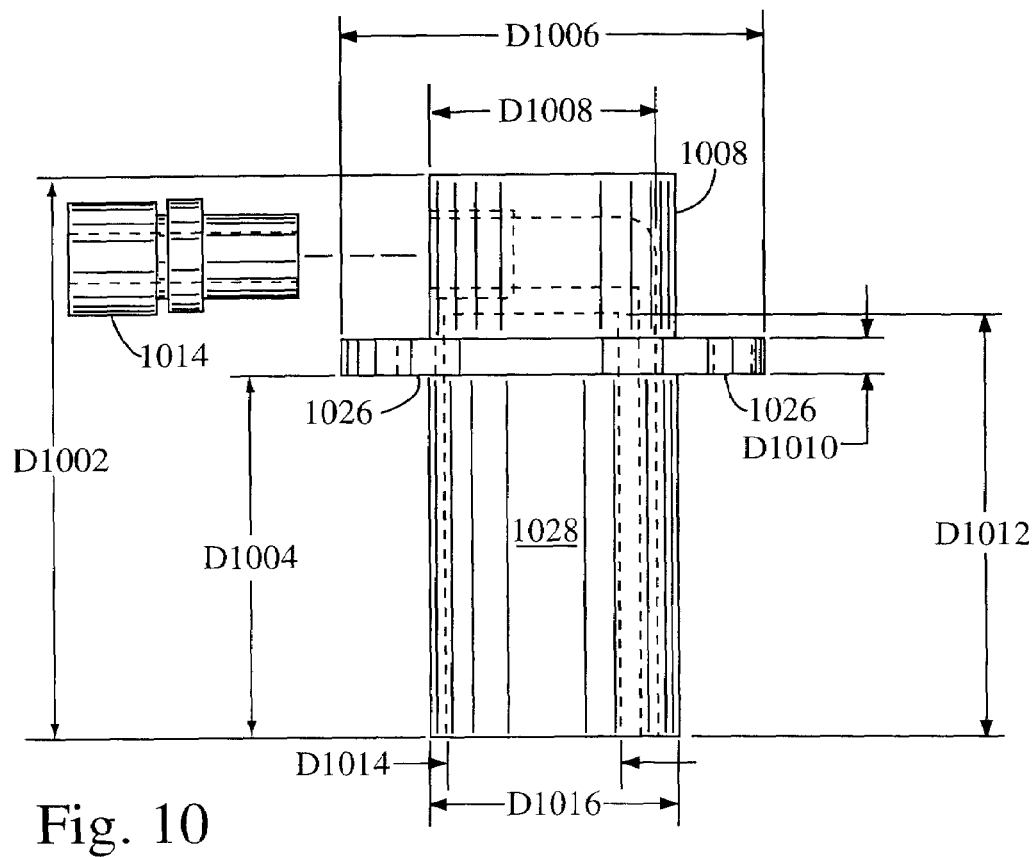
FIG. 10 is a mechanical drawing of the side of an embodiment of a sensor cap.

FIG. 10 is a mechanical drawing of the side of an embodiment of a sensor cap. It is to be understood that sensor cap 1008 of FIG. 10 is offered solely by way of example.

By way of example and not of limitation, the dimensions of sensor cap 1008 may be as follows: D1002=8.89 centimeters (3.50 inches), D1004=5.715 centimeters (2.25 inches), D1006=6.35 centimeters (2.50 inches), D1008=3.454 centimeters (1.36 inches), D1010=0.635 centimeter (0.25 inch), D1012=6.731 centimeter (2.65 inches), D1014=2.667 centimeter (1.05 inches), and D1016=3.759 centimeter (1.48 inches).

Visible in FIG. 10 are elements including cord grip 1014, channels 1026, and recess 1028. Recess 1028 may house a sensor collar spring (not shown) and a stillwell (not shown). Channels 1026 may allow sensor cap securing screws to pass through sensor cap 1008.

Figure 11A:
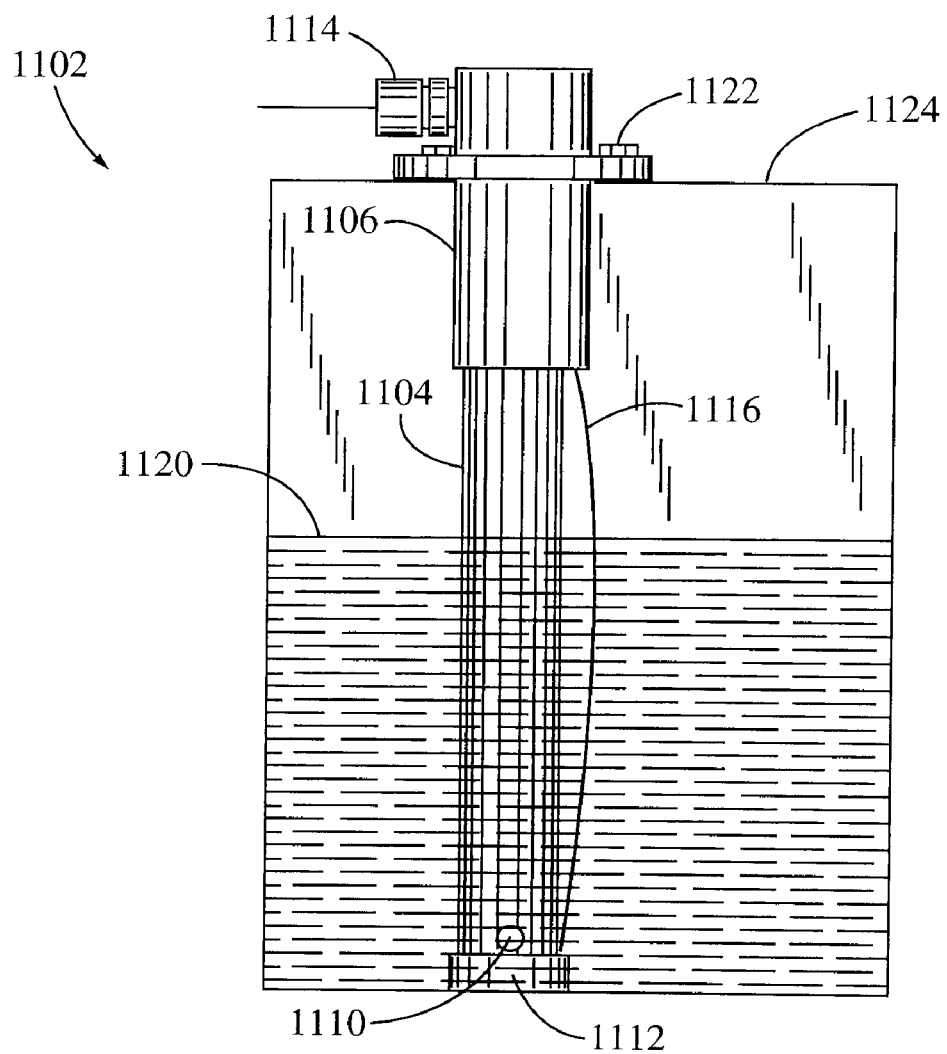
FIG. 11A is a side plan view of an embodiment of a fluid level sensor.

FIG. 11A is a side plan view of an embodiment of a fluid level sensor. Fluid level sensor 1102 may be installed in tank 1124 housing fluid 1118 with surface 1120. However, it is to be understood that fluid level sensor 1102 need not be installed in a tank.

Fluid level sensor 1102 may comprise stillwell 1104 having sensor port 1110. Transducer housing 1112, which may comprise transducer 110 (shown in FIG. 11C), may be attached to the bottom of stillwell 11104.

Sensor collar/cap 1106 may comprise a collar to house the top of stillwell 1104 as well as a cap to seal the top of fluid level sensor 1102. Sensor wiring 1116 may be connected to a transducer housed in sensor housing 1112, and sensor wiring 1116 may exit fluid level sensor 1102 via cord grip 1114. Sensor cap securing screws 1122 may be used to secure fluid level sensor 1102 to tank 1124.

Figure 11B:
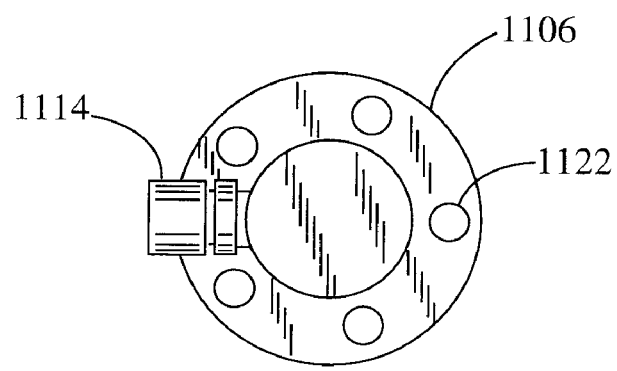
FIG. 11B is a top plan view of the sensor cap of the fluid level sensor of FIG. 11A.

FIG. 11B is a top plan view of sensor collar/cap 1106. Visible in FIG. 11B are elements including cord grip 1114 and sensor cap securing screws 1122.

Figure 11C:
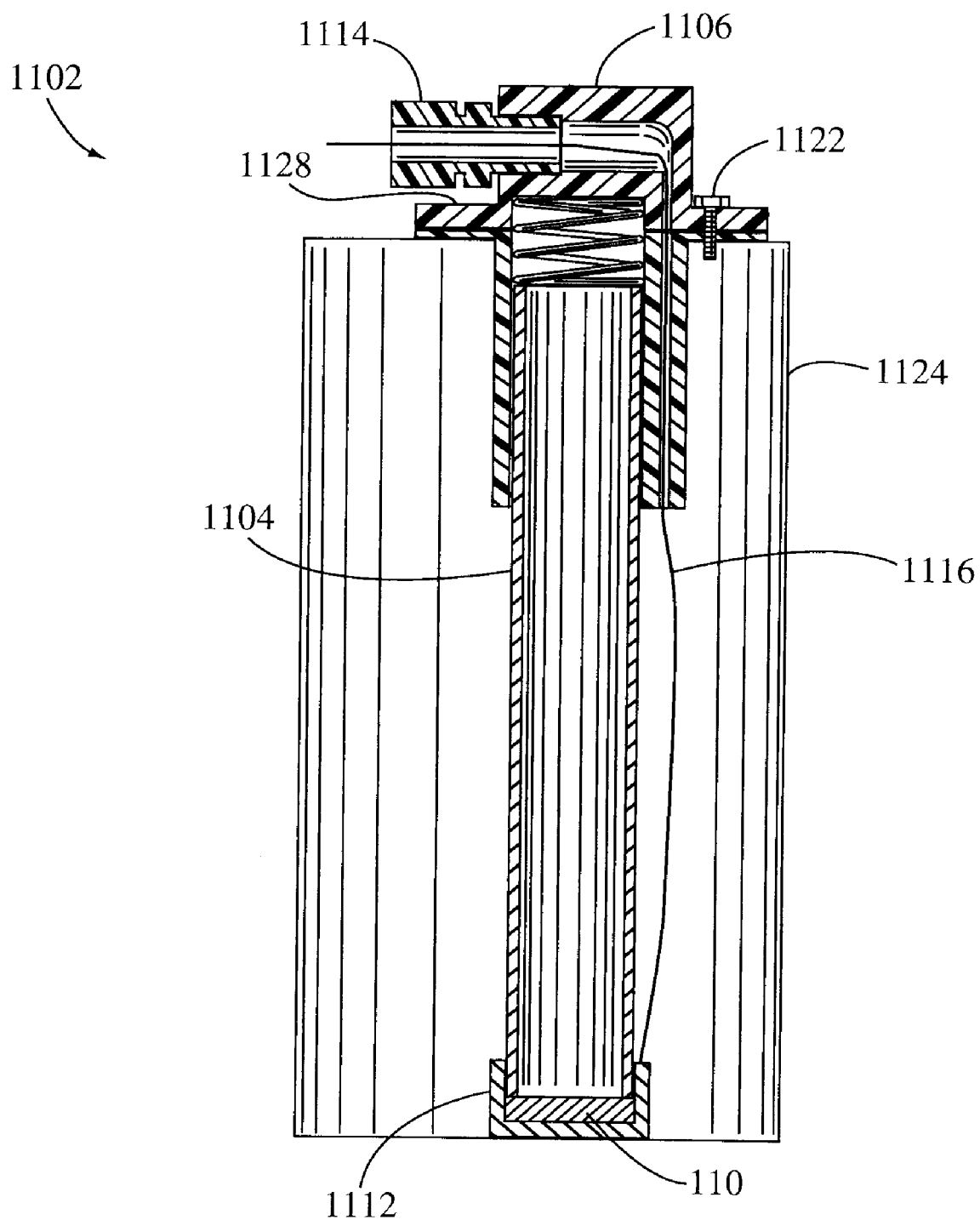
FIG. 11C is a cross sectional side view of the fluid level sensor of FIG. 11A.

FIG. 11C is a cross sectional side view of fluid level sensor 1102. Sensor collar spring 1128 is located in sensor collar/cap 1106 above stillwell 1104 such that stillwell 1104 may move in a vertical direction within sensor collar/cap 1106. Also visible in FIG. 11C are elements including cord grip 1114, sensor cap securing screw 1122, sensor wiring 1116, tank 1124, transducer housing 1112, and transducer 110.

Figure 12A:
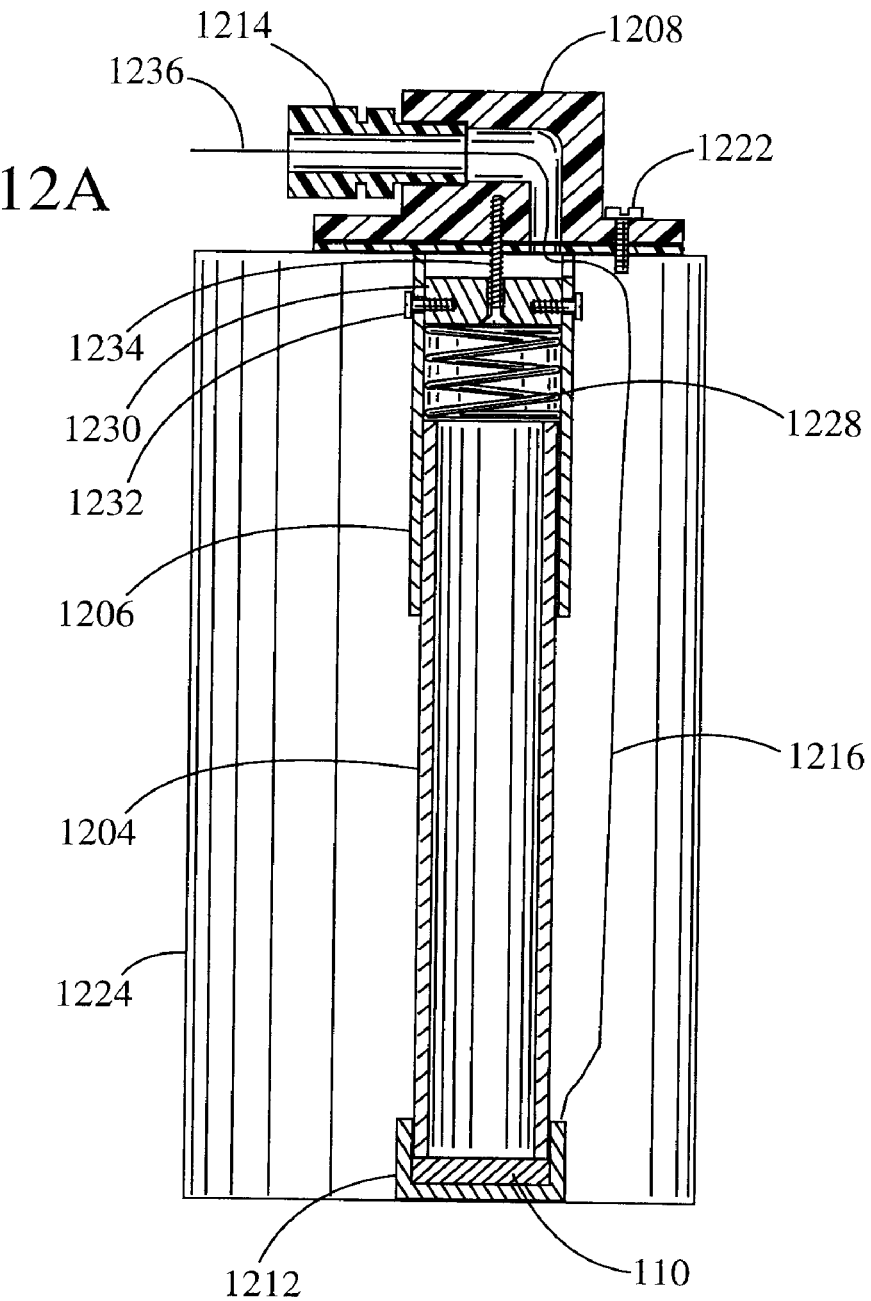
FIG. 12A is a cross sectional side view of an embodiment of a fluid level sensor.

FIG. 12A is a cross sectional side view of an embodiment of a fluid level sensor. Fluid level sensor 1202 is shown by way of example installed in tank 1224. It is to be understood that fluid level sensor 1202 need not be installed in a tank.

Fluid level sensor 1202 may comprise sensor collar securing block 1230 which may be used to attach sensor collar 1206 to sensor cap 1208. Sensor collar securing block 1230 may be attached to sensor collar 1206 via sensor collar block screws 1232. Sensor collar securing block 1230 may be attached to sensor cap 1208 via sensor collar securing screw 1234. Sensor cap securing screw 1222 may be used to connect sensor cap 1208 to tank 1224.

Sensor collar spring 1228 may be placed within sensor collar 1206 above stillwell 1204. Sensor collar spring 1228 may allow stillwell 1204 to move in a vertical direction within sensor collar 1206.

Transducer housing 1212 may be attached to the bottom of stillwell 1204. Transducer housing 1212 may house transducer 110.

Sensor wiring 1216 may connect to transducer 110 and run through channel 1236 of sensor cap 1208. Sensor wiring 1216 may exit fluid level sensor 1202 via cord grip 1214.

Figure 12B:
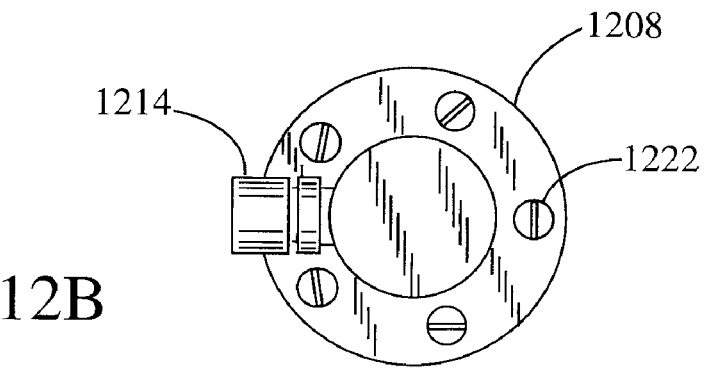
FIG. 12B is a top plan view of the sensor cap of the fluid level sensor of FIG. 12A.

FIG. 12B is a top plan view of sensor cap 1208. Visible in FIG. 12B are elements including cord grip 1214 and sensor cap securing screws 1222.

Figure 12C:
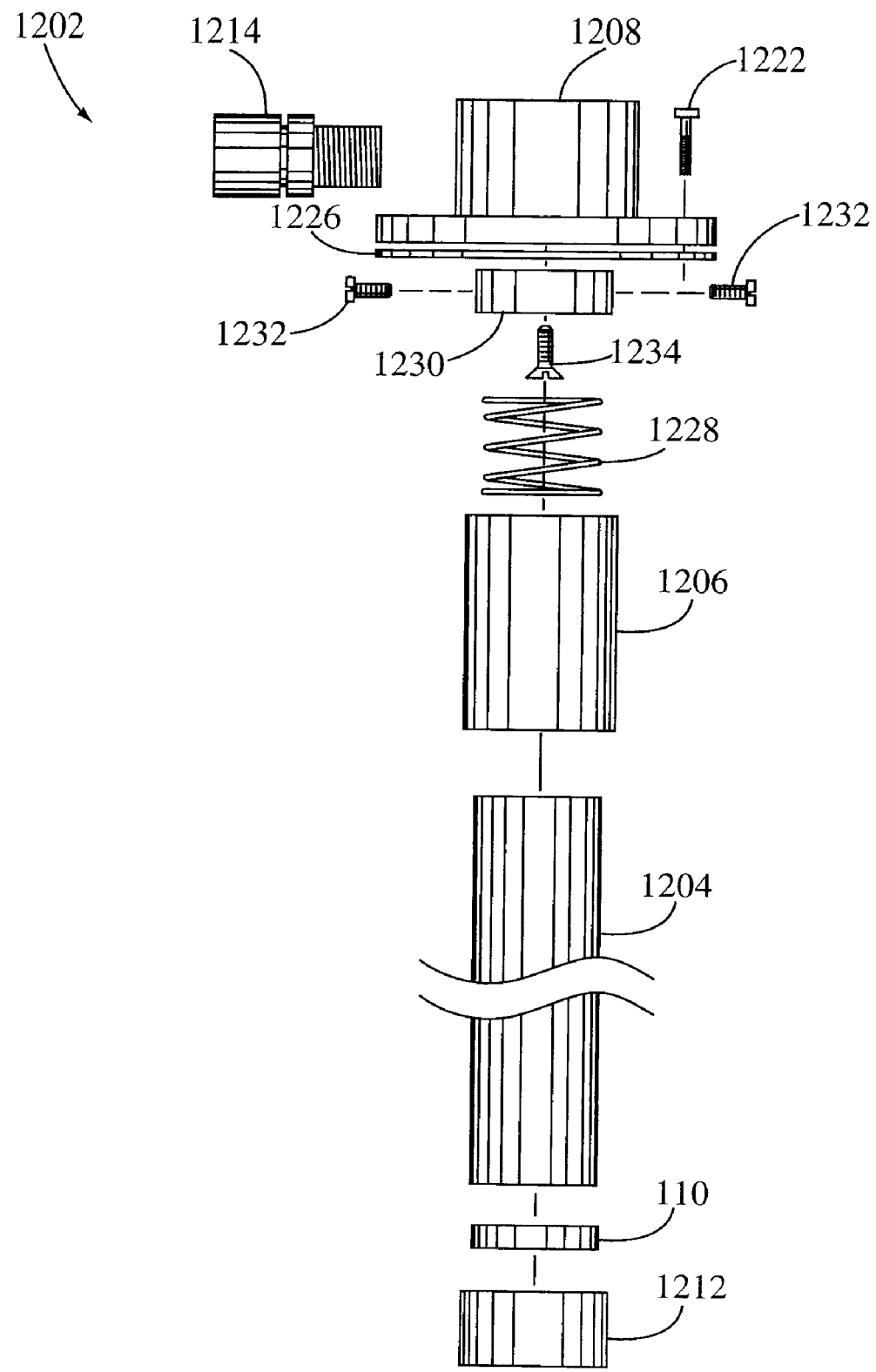
FIG. 12C is an exploded side plan view of the fluid level sensor of FIG. 12A.

FIG. 12C is an exploded side plan view of fluid level sensor 1202. Sealing gasket 1226 may be placed between sensor cap 1208 and sensor collar securing block 1230 in order to form a tight seal between sensor cap 1208 and sensor collar 1206. Also visible in FIG. 12C are elements including cord grip 1214, sensor collar securing screw 1234, sensor cap securing screw 1222, sensor collar block screws 1232, sensor collar spring 1228, stillwell 1204, transducer housing 1212, and transducer 110.

Figure 12D:
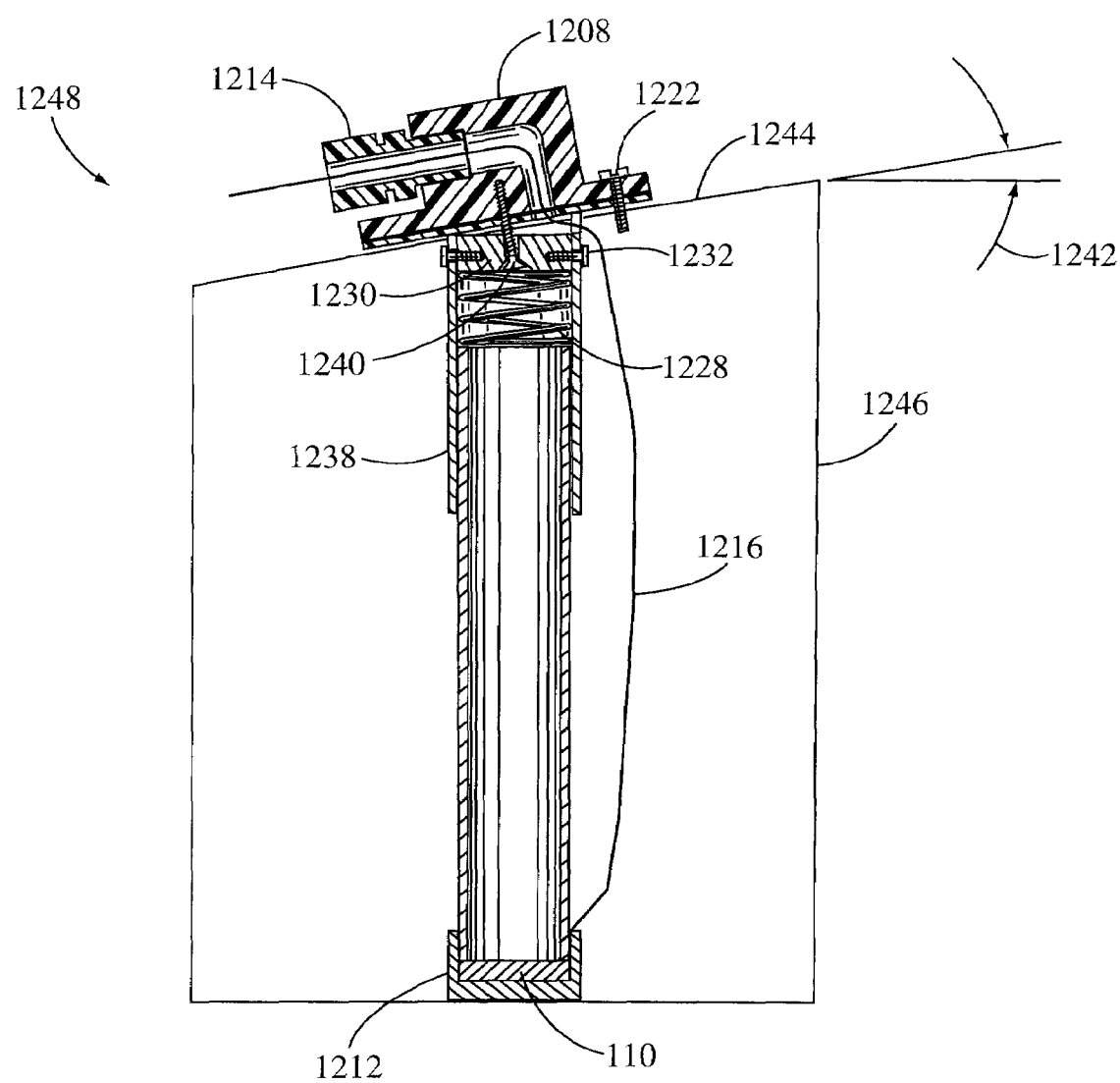
FIG. 12D is a cross sectional side view of an embodiment of the fluid level sensor of FIG. 12A.

FIG. 12D is a cross sectional side view of an embodiment of fluid level sensor 1202 of FIG. 12A. Fluid level sensor 1248 of FIG. 12D is similar to fluid level sensor 1202 of FIG. 12A with the exception that fluid level sensor 1248 may be used in tank 1246 with top surface 1244 sloped at angle 1242. However, it is to be understood that fluid level sensor 1248 need not be installed in a tank.

Fluid level sensor 1248 may comprise angled sensor collar 1238. The top end of angled collar sensor 1238 may be sloped at angle 1242 such that the top of angled sensor collar 1238 may fit flush with top surface 1244. Angle sensor collar securing screw 1240 may be used to connect sensor collar securing block 1230 to sensor cap 1208. Also visible in FIG. 12D are elements including cord grip 1214, stillwell 1204, sensor wiring 1216, sensor cap securing screw 1222, sensor collar block screw 1232, sensor collar spring 1228, transducer housing 1212, and transducer 110.

Figure 13A:
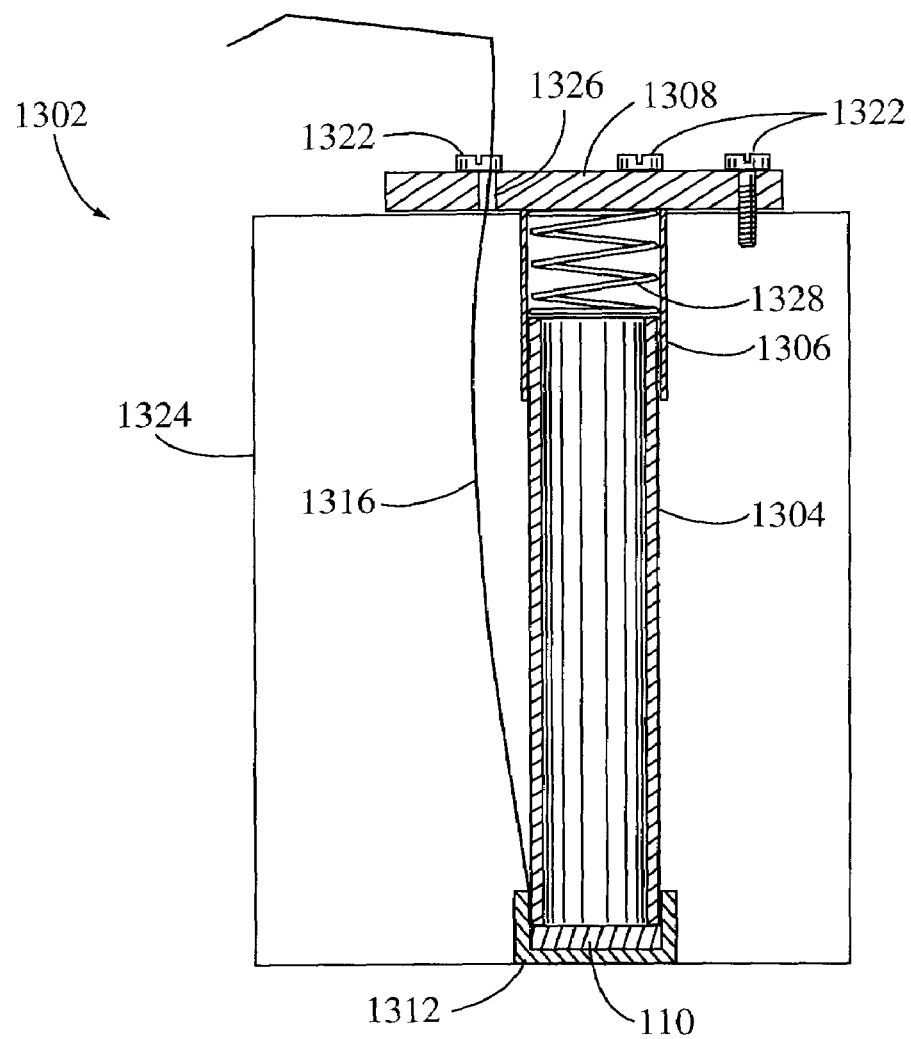
FIG. 13A is a cross sectional side view of an embodiment of a fluid level sensor.

FIG. 13A is a cross sectional side view of an embodiment of a fluid level sensor. By way of example, fluid level sensor 1302 is shown installed in tank 1324. It is to be understood that fluid level sensor 1324 need not be installed in a tank. Tank 1324 is shown in a cross sectional manner so that fluid level sensor 1302 is visible.

Fluid level sensor 1302 may comprise stillwell 1304 insertable into sensor collar 1306. Stillwell 1304 may be constructed of any suitable material, included but not limited to nylon, aluminum, brass, and plastic.

Sensor collar spring 1328 may allow stillwell 1304 to move vertically within sensor collar 1306. Sensor collar 1306 may be attached to sensor cap 1308. Sensor collar 1306 may be constructed of any suitable material, including but not limited to aluminum, plastic, brass or nylon. Sensor cap 1308 may be constructed of any suitable material, including but not limited to aluminum, plastic, brass or nylon.

Transducer housing 1312, which may house transducer 110, may be attached to the bottom of stillwell 1304. Sensor wiring 1316 may connect to transducer 110 and exit fluid level sensor 1302 via cable strain relief and seal 1326. Sensor cap securing screws 1322 may be used to secure sensor cap 1308 to tank 1324.

Figure 13B:
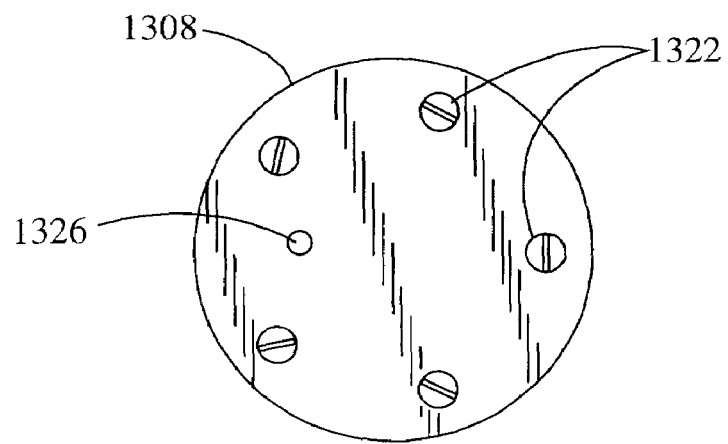
FIG. 13B is a top plan view of the sensor cap of the fluid level sensor of FIG. 13A.

FIG. 13B is a top plan view of sensor cap 1308. Visible in FIG. 13B are elements including cable strain relief and seal 1326 and sensor cap securing screws 1322.

Figure 14A:
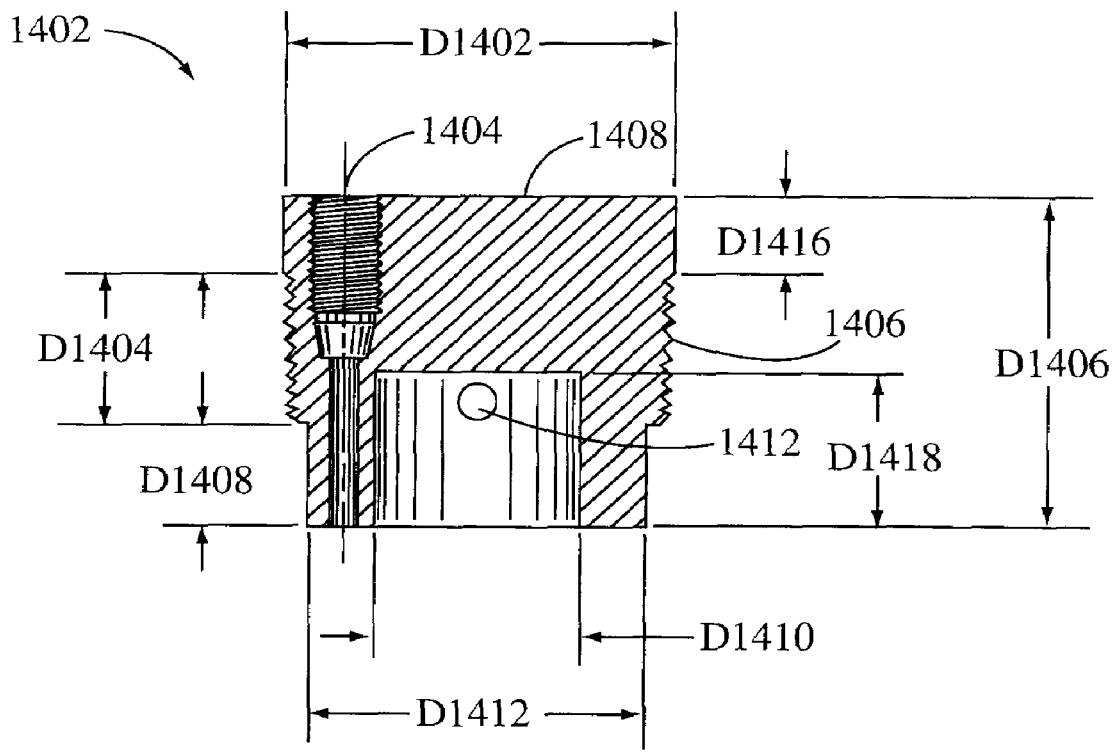
FIG. 14A is a mechanical drawing of the side of an embodiment of a sensor cap.

FIG. 14A is a mechanical drawing of the side of an embodiment of a sensor cap. Sensor cap 1402 is offered solely by way of example. Other embodiments of sensor caps are possible. Sensor cap 1402 may be connected to a sensor collar positioned in recess 1410 via set screw 1412. By way of example and not of limitation, sensor cap 1402 may be constructed of brass.

Sensor cap 1402 may comprises round, threaded side 1406 which may allow sensor cap 1402 to be screwed into a threaded opening in a tank. Sensor cap 1402 may comprise handle 1408, which may be in the shape of a hexagon, to provide a surface for an installer to grip sensor cap 1402. Sensor cap 1402 may comprises channel 1404 to permit a cable to pass through sensor cap 1402.

Figure 14B:
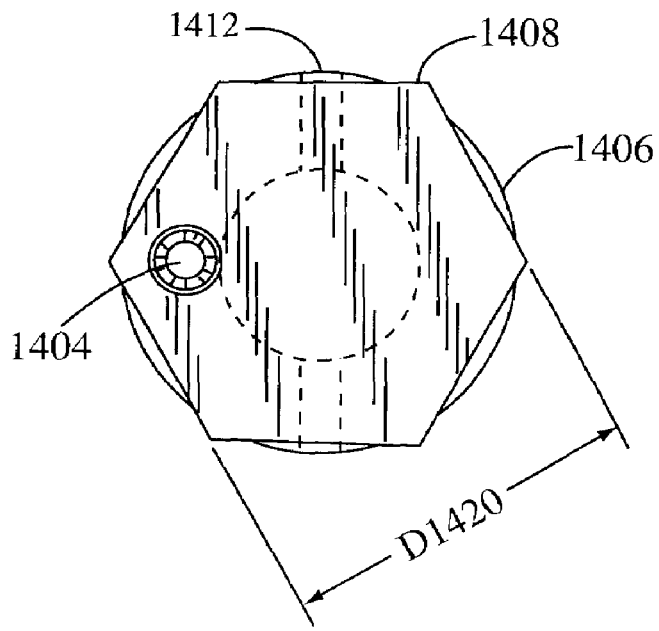
FIG. 14B is a mechanical drawing of the top of the sensor cap of FIG. 14A.

FIG. 14B is a mechanical drawing of the top of sensor cap 1402. Visible in FIG. 14B are elements including handle 1408, round side 1406, and channel 1404.

By way of example and not of limitations, the dimensions of sensor cap 1402 may be as follows: D1402=4.780 centimeters (1.882 inches), D1404=1.854 centimeters (0.730 inch), D1406=4.077 centimeters (1.605 inches), D1408=1.270 centimeters (0.500 inches), D1410=2.540 centimeters (1.000 inches), D1412=4.140 centimeters (1.630 inches), D1416=0.953 centimeter (0.375 inch), D1418=1.905 centimeters (0.750 inch) and D1420=4.445 centimeters (1.750 inches).

Figure 15:
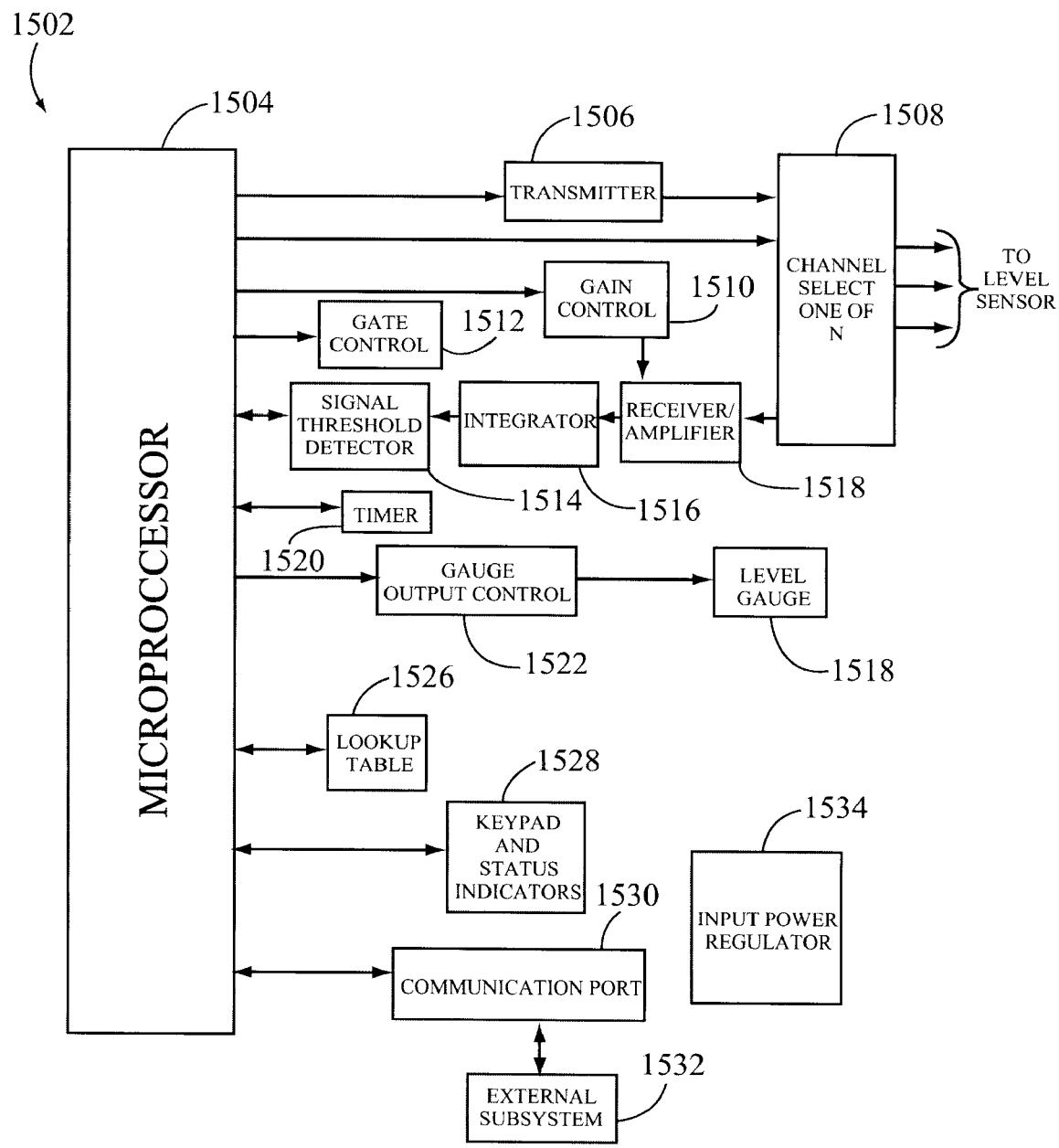
FIG. 15 is a block diagram of an embodiment of a control system.

FIG. 15 is a block diagram of an embodiment of control system 106. The embodiment of FIG. 15 will hereinafter be referred to as system 1502. It is to be understood that system 1502 is offered by way of example only—other embodiments of control system 106 are possible.

System 1502 may be partially or fully controlled by microprocessor 1504. Microprocessor 1504 may consist of any acceptable microprocessor. By way of example and not of limitation, microprocessor 1504 may comprise a general purpose computer, a special purpose computer, and/or an 8051 microprocessor.

Microprocessor 1504 may be controlled by software, firmware, hardware, and/or other forms of instructions. For example, microprocessor 1504 may be controlled by computer programming code written the C++ programming language or an assembly programming language. Such software, firmware, or other forms of instructions may be stored within system 1502, such as in non-volatile read-only memory or in a disc drive, or may be provided to system 1502 by an external subsystem.

System 1502 may also be partially or fully controlled by an external control system (not shown). Such external control system may be connected to system 1502 by any acceptable method, including but not limited to a local area network ("LAN"), a wide area network ("WAN"), a wireless network, a fiber optic network, and/or the Internet.

System 1502 may comprise channel select 1508. Channel select 1508 may be used to connect a plurality of fluid level sensors to system 1502. Channel select 1508 may control which of a plurality of fluid level sensors are connected to system 1502 at a given time.

Transmitter 1506 generates an electric excitation signal which is transmitted to a transducer. Transmitter 1506 may be connected to a transducer via channel select 1508. Alternately, if system 1502 is to control a single fluid level sensor, transmitter 1506 may be directly connected to the transducer of the fluid level sensor.

Microprocessor 1504 may control the frequency and/or duration of the excitation signal generated by transmitter 1506. Microprocessor 1504 starts timer 1520 at the same time transmitter 1506 is instructed to generate an excitation signal.

Receiver/amplifier 1518 receives and amplifies the electric return signal received from a transducer. Receiver/amplifier 1518 may be connected to one or more transducers via channel select 1508. Alternately, if system 1502 is to control a single fluid level sensor, receiver/amplifier 1518 may be directly connected to the transducer of the fluid level sensor. The amount of amplification provided by receiver/amplifier 1518 may be governed by gain control 1510. Gain control 1510 may be controlled by microprocessor 1504.

The output of receiver/amplifier 1518 is converted from a sinusoidal wave to a positive leading edge by integrator 1516. Signal threshold detector 1514 monitors the output of integrator 1516 when activated by gate control 1512. In order to reduce the likelihood of signal threshold detector 1514 detecting a false signal, gate control 1512 only activates signal threshold detector 1514 when a signal from integrator 1516 corresponding to a return signal is expected.

When signal threshold detector 1514 is activated by gate control 1512 and detects an output of integrator 1516 that exceeds a threshold level set by microprocessor 1504, signal threshold detector 1514 instructs timer 1520 to stop timing. Microprocessor 1504 may then record the time measured by timer 1520. This time corresponds to the time elapsed between when transmitter 1506 generated an excitation signal and when signal threshold detector 1514 detected a pulse that exceed a threshold level.

In a fluid level measuring system having a transducer located near the bottom of the fluid level sensor, the time measured by timer 1520 is directly proportional to the fluid's depth. In a fluid level measuring system having a transducer located near the top of the fluid level sensor, the time measured by timer 1520 is indirectly proportional to the fluid's depth. Lookup table 1526, which may be accessible to microprocessor 1504, may comprise information correlating measured time to the fluid's depth. The data within lookup table 1526 may be created during calibration of the fluid level measuring system. Gauge output control 1522 obtains the depth corresponding to the time measured by timer 1520 from lookup table 1526.

A signal corresponding to the depth of the fluid is transmitted by gauge output control 1522 to level gauge 1524 in any suitable manner. For example, gauge output control 1522 may emulate a variable resistor wherein the resistance of gauge output control 1522 varies in response to a change in depth of the fluid. Gauge output control 1522 may be connected to level gauge 1524 by an analog electric circuit such that a change in resistance of gauge output control 1522 results in a change in current through or voltage across level gauge 1524. Level gauge 1524 may comprise any instrument that communicates depth of the fluid, such as an analog or digital fuel gage.

System 1502 may also transmit information related to the fluid being measured to external subsystem 1532 via communication port 1530. For example, system 1502 may transmit to external subsystem 1532 information including depth of the fluid, change in depth of the fluid, and/or temperature of the fluid.

External subsystem 1532 may be any sort of system that displays and/or processes information related to the fluid. For example, external subsystem 1532 may indicate the depth of the fluid. As another example, external subsystem 1532 may process fluid fuel depth information from system 1502 to determine the distance a vehicle may travel based on the current depth of fuel in its fuel tank.

System 1502 may communicate with external subsystem 1532 in any acceptable manner. For example, system 1502 may communicate with external subsystem 1532 via an analog communication system. As another example, system 1502 may communicate with external subsystem 1532 via an electrical or optical digital communication system, such as a system that operates with a RS232, RS485, or CAN BUS architecture.

System 1502 may comprise input power regulator 1534 to provide the necessary power to system 1502. Alternately, system 1502 may be powered by an external power system. System 1502 may also comprise keypad and status indicators 1528.

Figure 16:
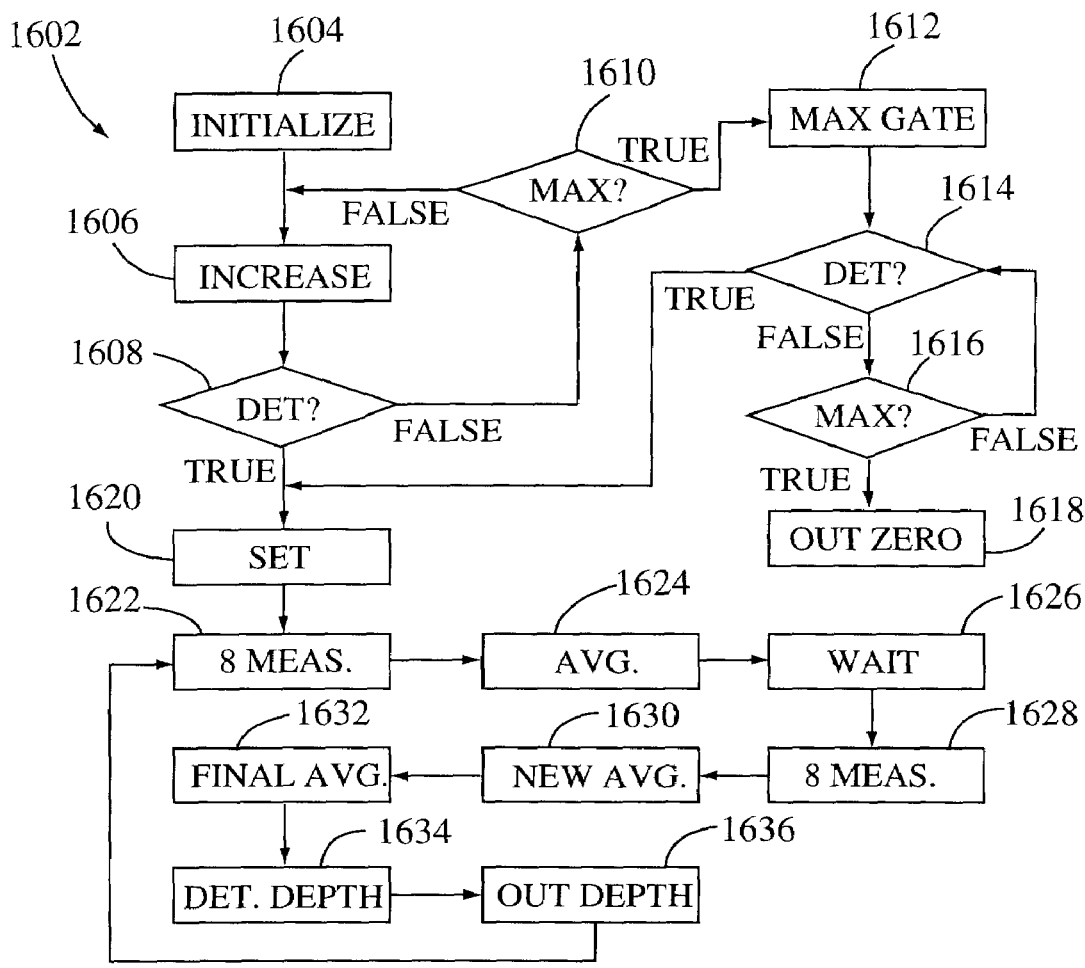
FIG. 16 is a flow chart of a method of operation of the control system of FIG. 15.

FIG. 16 is a flow chart of one possible method of operation of system 1602. It is to be understood that method of operation 1602 of FIG. 16 is offered solely as an example. Other methods of operation are possible.

Method 1602 begins with step 1604 wherein microprocessor 1504 initially sets the following system 1502 parameters as follows: (1) the width of the excitation signal to be generated by transmitter 1506 is set to a predetermined minimum value (e.g. 4 microseconds), (2) the amplitude of the excitation signal to be generated by transmitter 1506 is set to a predetermined minimum value, (3) the gain of receiver/amplifier 1518 is set to a predetermined minimum value, and (4) gate control 1512 is set to a predetermined range (e.g. signal threshold detector 1514 is active from 20 to 200 microseconds after transmitter 1506 generates an excitation signal).

Method 1602 proceeds to step 1606 in which microprocessor 1504 increases the width and amplitude of the excitation signal generated by transmitter 1506 and the gain of receiver/amplifier 1518 by predetermined amounts. Decision 1608 next determines if signal threshold detector 1514 receives an input from integrator 1516 that exceeds the threshold level. (The situation where the signal from integrator 1516 exceeds the threshold level is hereinafter referred to as "Detection"). If the result of decision 1608 is false, method 1602 proceeds to decision 1610. Decision 1610 determines if the width and amplitude of the excitation signal generated by transmitter 1506 and the gain of receiver/amplifier 1518 are set at their maximum values. If the result of decision 1610 is false, method 1602 returns to step 1606. If the result of decision 1610 is true, method 1602 proceeds to step 1612 where the detection gate duration is set to its maximum value. Method 1602 proceeds from step 1612 to decision 1614 which again checks for Detection. If the result of decision 1614 is true, method 1602 proceeds to step 1620. If the result of decision 1614 is false, method 1602 proceeds to decision 1616 which determines if a predetermined number of Detection attempts have occurred. If the result of decision 1616 is false, method 1602 returns to decision 1614. If the result of decision 1616 is true, method 1602 proceeds to step 1618. In step 1618, microprocessor 1504 instructs gauge output control 1522 to output zero fluid depth to level gauge 1524. Such condition indicates that the fluid's depth is zero or that the fluid level measuring system is not working.

Method 1602 reaches step 1620 if either decisions 1608 or 1614 are true. In step 1620, gate control 1512 sets the detection gate such that signal threshold detector 1514 is active from a time just before Detection to a time just after Detection. Additionally, gain control 1510 increases the gain of receiver/amplifier 1518 in step 1620. Method 1602 then proceeds to step 1622 where system 1502 conducts eight fluid depth measurements and saves the Travel Time for each measurement. Method 1602 next proceeds to step 1624 wherein microprocessor 1504 determines the average Travel Time by adding each of the eight Travel Times and dividing the sum by eight. This quantity is referred to as the "Average Detection Time".

Method 1602 proceeds to step 1626 wherein system 1602 waits a predetermined amount of time. Subsequently, method 1602 proceeds to step 1628 wherein microprocessor 1504 again conducts eight fluid depth measurements and then to step 1630 wherein microprocessor 1504 averages the corresponding Travel Times. Such average is referred to as the "New Average Detection Time".

Method 1602 proceeds to step 1632 wherein microprocessor 1504 then computes a weighted average of the Average Detection Time and the New Average Detection Time. Such weighted average, referred to as the "Final Average", is computed as follows:

$$FinalAverage = \frac{(AverageDetectionTime)(3) + NewAverageDetectionTime}{4}.$$

Microprocessor 1504 then compares Final Average to information stored within lookup table 1526 in step 1634 to determine the depth of the fluid. In step 1636, microprocessor 1504 next communicates the fluid's depth to gauge output control 1522 which in turn drives level gauge 1524 to display the fluid's depth. Method 1602 subsequently returns to step 1622 to re-determine the fluid's depth.

Figure 17A:
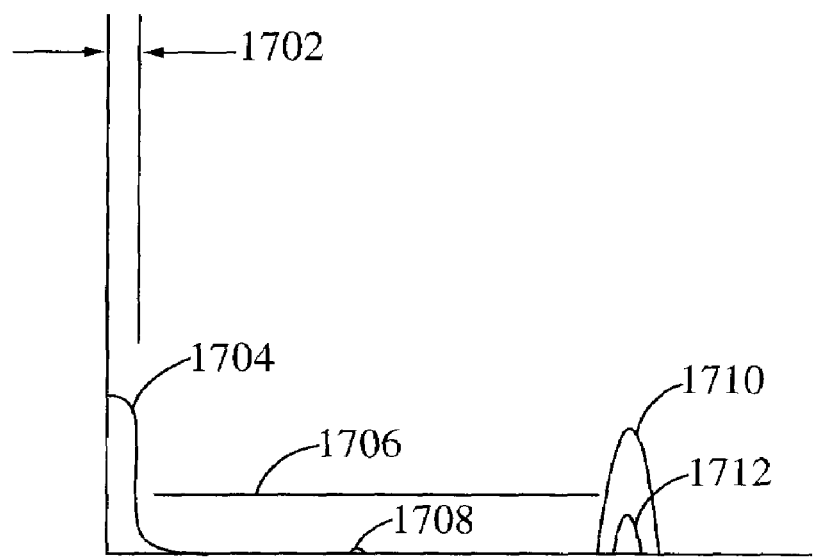
FIG. 17A is a graph of signal amplitude versus time.
Figure 17B:
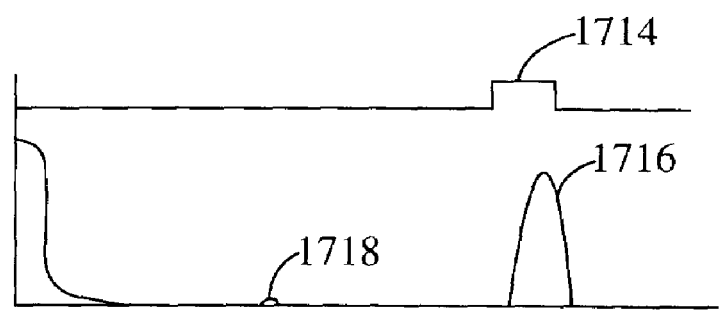
FIG. 17B is a graph of signal amplitude versus time.
Figure 17C:
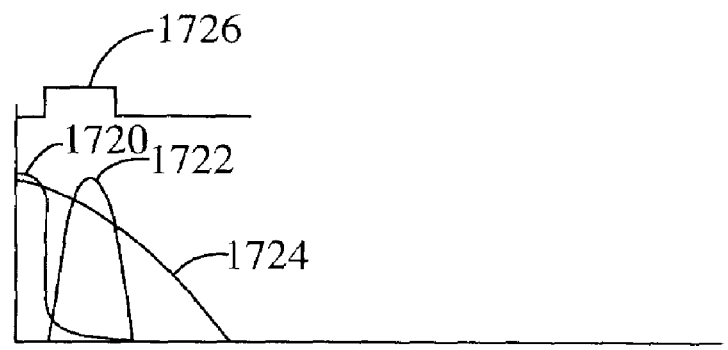
FIG. 17C is a graph of signal amplitude versus time.

FIGS. 17A to 17C comprise waveforms illustrating portions of method of operation 1602 of FIG. 16. FIG. 17A is a graph of signal amplitude versus time. Waveform 1704 is an excitation signal of width 1702 generated by transmitter 1506. As explained above, the excitation signal is transmitted to a transducer via a conductor, and the transducer captures a reflected waveform and converts it to a return signal. The return signal is transmitted to amplifier/receiver 1518 via the conductor where it is received and amplified by receiver/amplifier 1518. Integrator 1516 integrates the pulse from amplifier/receiver 1518. Waveforms 1708, 1710, and 1712 represent the output of integrator 1516 under various conditions. Line 1706 represents the threshold level.

Because signal threshold detector 1514 only stops timer 1520 in response to an output of integrator 1516 which exceeds threshold level 1706, signal threshold detector 1514 will not stop timer 1520 in response to waveform 1712. As noted above, microprocessor 1504 will increase the width and amplitude of the excitation signal generated by transmitter 1506 as well as the gain of receiver/amplifier 1518 until the output of integrator 1516 exceeds threshold level 1706. Waveform 1710 represents an output of integrator 1516 that exceeds threshold level 1706. Consequently, signal threshold detector 1514 will stop timer 1520 in response to waveform 1710.

Waveform 1708 represents an output of integrator 1516 corresponding to interference, imperfections in the construction of the fluid level sensor, or other non-ideal properties of the fluid level measuring system and/or its operating environment. Thus, waveform 1708 does not correspond to the reflection of a wave from the surface of the fluid being measured. Consequently, signal threshold detector 1514 will not stop timer 1520 in response to waveform 1708. This is accomplished by microprocessor 1504 setting threshold 1706 sufficiently above any expected false signals, such as waveform 1708. As shown in FIG. 17A, detection threshold 1706 is greater than the magnitude of waveform 1708. Therefore, signal threshold detector 1514 does not stop timer 1520 in response to waveform 1708.

FIG. 17B shows the operation of the detection gate. As shown in FIG. 17B, the detection gate signal 1714 is at a logic high level only for a duration beginning a predetermined amount of time before the expected arrival of waveform 1716 from the output of integrator 1516 and ending after the detection of waveform 1716. Use of a detection gate allows the amplitude of the transmitted pulse generated by transmitter 1506 and/or the gain of receiver/amplifier 1518 to be increased to improve the detection of the leading edge of the output of integrator 1516 while retaining immunity from false signals, such as waveform 1718.

Measuring the depth of a fluid when the fluid surface is near the transducer may present special requirements for system 1502. Such situation may occur when the fluid depth is shallow and the transducer is located near the bottom of the fluid level sensor. Alternately, such situation may occur when the fluid is deep and the transducer is located near the top of the fluid level sensor.

FIG. 17C illustrates operation of system 1502 when the fluid surface is near the transducer. Waveform 1720 represents the excitation signal generated by transmitter 1506, waveform 1726 represents a detection gate signal, and waveform 1722 represents the output of integrator 1516 in response to a return signal. Waveform 1724 represents an output of integrator 1516 that occurs immediately upon generation of excitation signal 1720. Waveform 1724, which is referred to as "ringdown", is the result of undesired coupling between excitation signal 1720 and receiver/amplifier 1518. Because ringdown waveform 1724 is not the result of a waveform being reflected by the fluid surface, it is desired that signal threshold detector 1514 not stop timer 1520 in response to ringdown waveform 1724. It should be noted that the magnitude of ringdown waveform 1724 is close to that of waveform 1722. In order to enable signal threshold detector 1514 to respond to waveform 1722 but not respond to ringdown waveform 1724, it is necessary for microprocessor 1504 to take one or more of the following actions when the fluid surface is near the transducer: (1) reduce the amplitude of the excitation signal generated by transmitter 1506, (2) reduce the gain of receiver/amplifier 1518, (3) increase the detection threshold, or (4) reduce pulse width.

Figure 18:
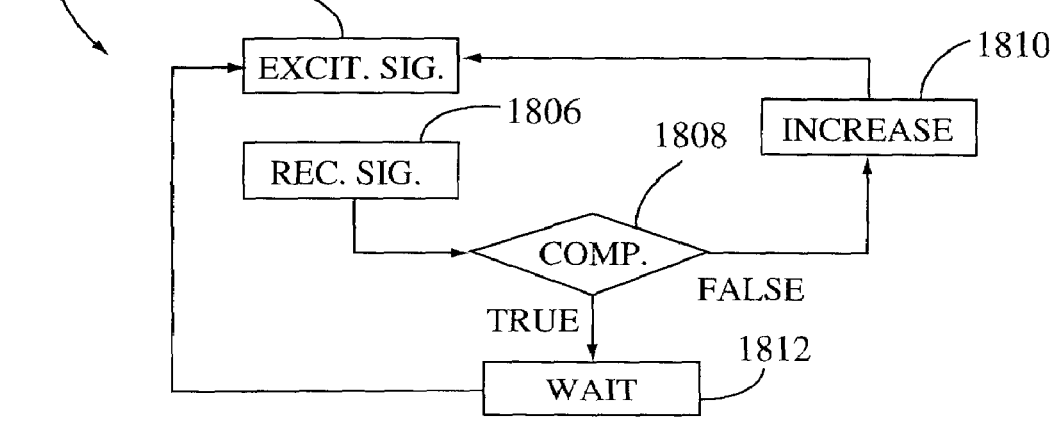
FIG. 18 is a flow chart of a method of operation of an embodiment of a control system.

FIG. 18 is a flow chart of a method of operation 1802 of another embodiment of control system 106. Such embodiment of control system 106 will hereinafter be referred to as the variable frequency control system.

The frequency of the excitation signal generated by the variable frequency control system is proportional to the distance between the transducer and the fluid surface. Method 1802 begins at step 1804 where the variable frequency control system transmits an excitation signal to the transducer via a conductor. A return signal is received by the variable frequency control system in operation 1806. The amount of time that elapses between operations 1804 and 1806 is directly proportional to the distance between the transducer and the fluid surface.

The return signal is compared to a threshold in decision 1808. If the magnitude of the return signal is less than the threshold, the result of decision 1808 is false. Otherwise, the result of decision 1808 is true.

If the result of decision 1808 is false, the gain and/or width of the excitation signal to be generated is increased in step 1810. Method 1802 then proceeds from step 1810 back to step 1804 where an excitation signal is again generated.

If the result of decision 1808 is true, method 1802 proceeds to step 1812 wherein the variable frequency control system waits a predetermined amount of time. Method 1802 then returns to step 1804 where an excitation signal is again generated.

The steady state frequency of method 1802 is inversely proportional to the amount of time that elapses between operations 1804 and 1806. Because the amount of time that elapses between operations 1804 and 1806 is directly proportional to the distance between the transducer and the fluid surface, the frequency of method 1802 is indirectly proportional to the distance between the transducer and the fluid surface. The variable frequency control system can thereby estimate the depth of the fluid to be measured from the frequency of method 1802.

The variable frequency control system can be implemented in any acceptable manner. For example, the variable frequency control system may be implemented by a system that does not comprise a microprocessor.

Figure 19:
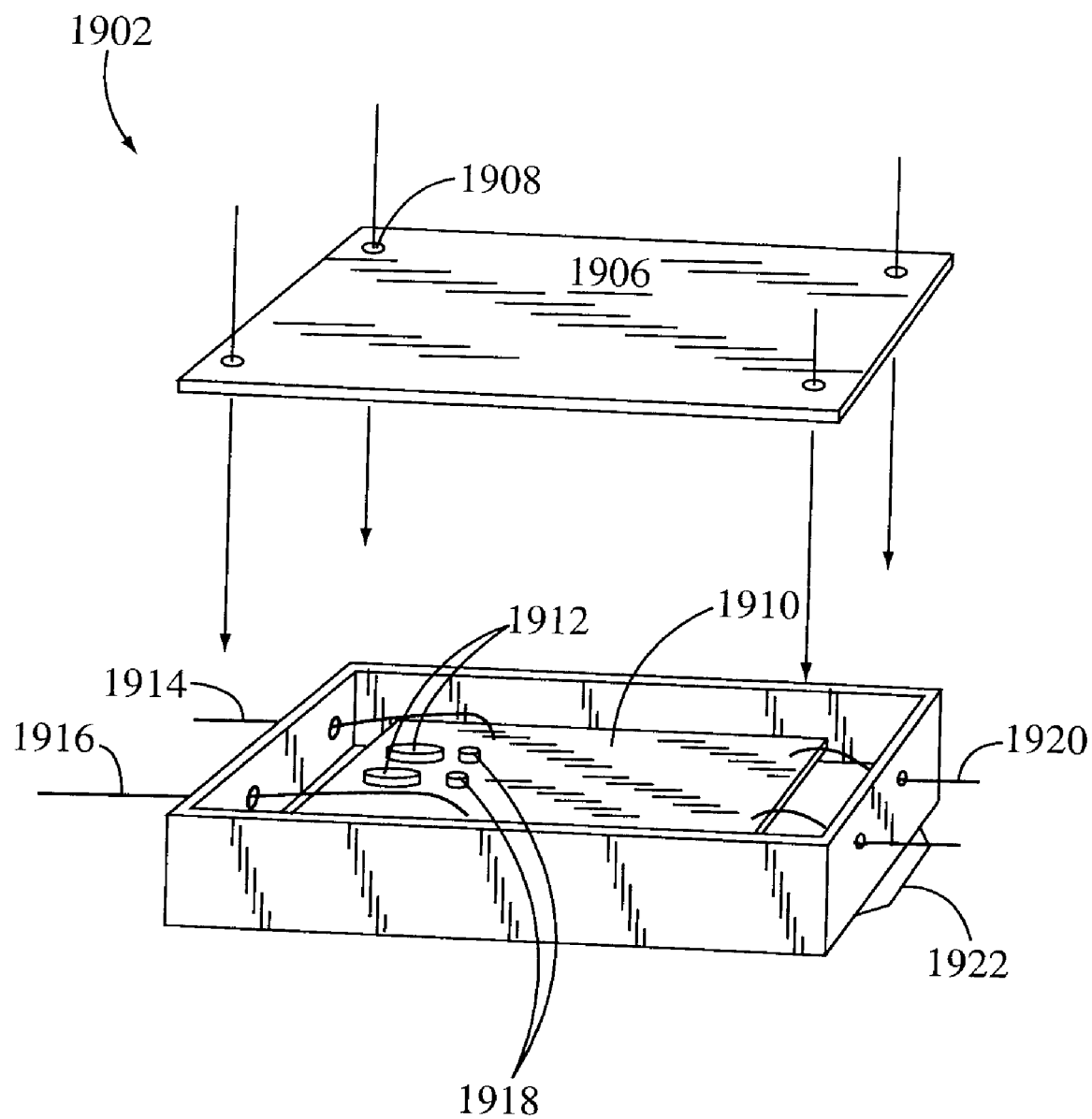
FIG. 19 is a top perspective view of an enclosure for a control system.

FIG. 19 is a top perspective view of enclosure 1902, an embodiment of an enclosure for control system 106. Enclosure 1902 may serve to protect control system 106 from adverse environmental conditions. It is to be understood that enclosure 1902 is being offered by way of example and not of limitation. Control system 106 may be housed in other enclosures, integrated in other systems, or not enclosed at all.

Enclosure 1902 may comprise chassis 1904 and cover 1906. Printed circuit board ("PCB") 1910, which may house some or all components of control system 106, may be mounted within chassis 1904. Cover 1906 may be secured to chassis 1904 via securing screws 1908. Enclosure 1902 may be secured to a mounting surface, such as the body of a watercraft or vehicle, via mounting bracket 1922.

PCB 1910 may be connected to one or more liquid level sensors via sensor wiring 1920. One or more gauges may be connected to PCB 1910 via gauge wiring 1916. Digital interface wiring 1914 may be used to connect PCB 1910 to one or more external subsystems. Sensor wiring 1920, gauge wiring 1916, and/or digital interface wiring 1914 may be connected to PCB 1910 via U-Y connectors from 3M Company.

PCB 1910 may comprise push buttons 1912 which may allow a user to calibrate a liquid level measuring system controlled by control system 106. Light emitted diodes 1918 and/or a digital display (not shown) may be provided to indicate to a user the status of a liquid level measuring system controlled by control system 106.

| PARTIAL GLOSSARY | |
|---|---|
| 102 | fluid level measuring system |
| 104 | fluid level sensor |
| 106 | control system |
| 108 | stillwell |
| 110 | transducer |
| 112 | sensor port |
| 114 | fluid level gauge |
| 116 | cable |
| 118 | cable |
| 120 | fluid |
| 122 | fluid surface |
| 124 | fluid depth |
| 126 | wave |
| 128 | wave |
| 130 | wave |
| 132 | vessel |
| 134 | fluid surface |
| 202 | fluid level measuring system |
| 204 | fluid level sensor |

-continued

| PARTIAL GLOSSARY | |
|---|---|
| 302 | fluid level measuring system |
| 304 | fluid level sensor |
| 306 | fluid level sensor |
| 308 | vessel |
| 310 | vessel |
| 312 | cable |
| 314 | cable |
| 316 | cable |
| 318 | fluid level gauge |
| 320 | fluid level gauge |
| 402 | calibration process |
| 404 | input current depth |
| 406 | measure reference time |
| 408 | calibration process |
| 410 | measure reference time |
| 412 | input current depth |
| 502 | input method |
| 504 | activate input subsystem |
| 506 | set to zero |
| 508 | increase gauge |
| 510 | stop input subsystem |
| 512 | store current depth |
| 602 | fluid level sensor |
| 604 | fuel tank |
| 606 | watercraft |
| 608 | cable |
| 610 | fuel level indicator |
| 612 | opening |
| 614 | cable |
| 702 | recreational vehicle |
| 704 | fluid level sensor |
| 706 | fuel tank |
| 708 | cable |
| 710 | fuel level indicator |
| 712 | cable |
| 714 | opening |
| 802 | fluid level sensor |
| 804 | stillwell |
| 806 | sensor collar |
| 808 | sensor cap |
| 810 | sensor port |
| 812 | transducer housing |
| 814 | cord grip |
| 816 | sensor wiring |
| 818 | fluid |
| 820 | fluid surface |
| 822 | sensor cap securing screws |
| 824 | tank |
| 826 | sealing gasket |
| 828 | sensor collar spring |
| 830 | recess |
| D902 | dimension |
| D904 | dimension |
| D906 | dimension |
| D908 | dimension |
| D910 | dimension |
| D912 | dimension |
| D914 | dimension |
| D916 | dimension |
| D918 | dimension |
| D920 | dimension |
| D922 | dimension |
| D924 | dimension |
| D926 | dimension |
| 1008 | sensor cap |
| 1014 | cord grip |
| 1026 | channel |
| 1028 | recess |
| D1002 | dimension |
| D1004 | dimension |
| D1006 | dimension |
| D1008 | dimension |
| D1010 | dimension |
| D1012 | dimension |
| D1014 | dimension |
| D1016 | dimension |
| 1102 | fluid level sensor |

-continued

| PARTIAL GLOSSARY | | |
|---|---|---|
| 1104 | stillwell | |
| 1106 | sensor collar/cap | |
| 1110 | sensor port | |
| 1112 | transducer housing | |
| 1114 | cord grip | |
| 1116 | sensor wiring | |
| 1118 | fluid | |
| 1120 | fluid surface | |
| 1122 | sensor cap securing screws | |
| 1124 | tank | |
| 1128 | sensor collar spring | |
| 1202 | fluid level sensor | |
| 1204 | stillwell | |
| 1206 | sensor collar | |
| 1208 | sensor cap | |
| 1212 | transducer housing | |
| 1214 | cord grip | |
| 1216 | sensor wiring | |
| 1222 | sensor cap securing screws | |
| 1224 | tank | |
| 1226 | sealing gasket | |
| 1228 | sensor collar spring | |
| 1230 | sensor collar securing block | |
| 1232 | sensor collar block screw | |
| 1234 | sensor collar securing screw | |
| 1236 | channel | |
| 1238 | angled sensor collar | |
| 1240 | sensor collar securing screw | |
| 1242 | angle | |
| 1244 | top surface | |
| 1246 | tank | |
| 1248 | fluid level sensor | |
| 1302 | fluid level sensor | |
| 1304 | stillwell | |
| 1306 | sensor collar | |
| 1308 | sensor cap | |
| 1312 | transducer housing | |
| 1316 | sensor wiring | |
| 1322 | sensor cap securing screw | |
| 1324 | tank | |
| 1326 | cable strain relief and seal | |
| 1402 | sensor cap | |
| 1404 | channel | |
| 1406 | side | |
| 1408 | top | |
| 1410 | recess | |
| 1412 | setscrew | |
| D1402 | dimension | |
| D1404 | dimension | |
| D1406 | dimension | |
| D1408 | dimension | |
| D1410 | dimension | |
| D1412 | dimension | |
| D1416 | dimension | |
| D1418 | dimension | |
| D1420 | dimension | |
| 1502 | control system | |
| 1504 | microprocessor | |
| 1506 | transmitter | |
| 1508 | channel select | |
| 1510 | gain control | |
| 1512 | gate control | |
| 1514 | threshhold detector | |
| 1516 | integrator | |
| 1518 | receiver/amplifer | |
| 1520 | timer | |
| 1522 | gauge output control | |
| 1524 | level timer | |
| 1526 | lookup table | |
| 1528 | keypad/status | |
| 1530 | communications port | |
| 1532 | external subsystem | |
| 1534 | power supply | |
| 1602 | method of operation | |
| 1604 | initialize | |
| 1606 | increase | |
| 1608 | detection? | |

-continued

| PARTIAL GLOSSARY | | |
|---|---|---|
| 1610 | maximum? | |
| 1612 | maximum detection gate | |
| 1614 | detection? | |
| 1616 | maximum detection attempts? | |
| 1618 | output zero | |
| 1620 | set gate control/gain | |
| 1622 | conduct 8 measurements | |
| 1624 | determine average detection time | |
| 1626 | wait | |
| 1628 | conduct 8 measurements | |
| 1630 | determine new average detection time | |
| 1632 | final average | |
| 1634 | determine depth | |
| 1636 | output depth | |
| 1702 | width | |
| 1704 | waveform | |
| 1706 | detection threshold | |
| 1708 | waveform | |
| 1710 | waveform | |
| 1712 | waveform | |
| 1714 | detection gate | |
| 1716 | waveform | |
| 1718 | waveform | |
| 1720 | waveform | |
| 1722 | waveform | |
| 1724 | waveform | |
| 1726 | detection gate | |
| 1802 | method of operation | |
| 1804 | generate excitation signal | |
| 1806 | receive return signal | |
| 1808 | compare return signal to threshold | |
| 1810 | increase gain or width | |
| 1812 | wait | |
| 1902 | enclosure | |
| 1904 | chassis | |
| 1906 | cover | |
| 1908 | securing screws | |
| 1910 | PCB | |
| 1912 | push button | |
| 1914 | digital interface wiring | |
| 1916 | gauge wiring | |
| 1918 | LEDs | |
| 1920 | sensor wiring | |
| 1922 | mountain bracket | |

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. In a fluid tank wherein said tank is susceptible to movement, and wherein a calibration fluid level in said tank is known, an improved ultrasonic fluid level sensor comprising:

a stillwell having a vertical mount in said tank;

said stillwell having a segment extending above a maximum level of said fluid;

said stillwell having a hole at a bottom segment to provide a fluid communication between a tank fluid level and a stillwell fluid level;

an ultrasonic transducer mounted in said stillwell;

wherein a fluid level indicator is set at the known calibration fluid level and a calibration signal is sent from the transducer to the known calibration fluid level and back to the transducer, thereby creating a reference time measurement of the calibration signal which corresponds to the fluid level indicator setting; and wherein subsequent variations in the fluid level are indicated on the fluid level indicator in a predetermined relationship with subsequent reference time measurements.

2. The improved ultrasonic fluid level sensor of claim 1, wherein the ultrasonic fluid level sensor further comprises a single stillwell.

3. The improved ultrasonic fluid level sensor of claim 1, wherein the ultrasonic transducer is located in the bottom segment of said stillwell.

4. The improved ultrasonic fluid level sensor of claim 3, wherein the ultrasonic transducer is located in a transducer housing attached to a bottom of said stillwell.

5. The improved ultrasonic fluid level sensor of claim 1, wherein the ultrasonic transducer is located in a top segment of said stillwell, and wherein the calibration signal travels through air to the known fluid level and back to the transducer.

6. The improved ultrasonic fluid level sensor of claim 1 further comprising a mounting subsystem attachable to a top segment of the stillwell.

7. The improved ultrasonic fluid level sensor of claim 6, wherein the mounting subsystem further comprises a spring, the spring applying a force on the stillwell onto a bottom of the tank.

8. The improved ultrasonic fluid level sensor of claim 7, wherein the mounting subsystem further comprises a sensor cap and a sensor collar.

9. The improved ultrasonic fluid level sensor of claim 8, wherein the stillwell may slide within the sensor collar.

10. The improved ultrasonic fluid level sensor of claim 8, wherein a top segment of the sensor collar is cut at an angle allowing the sensor collar to be vertically mounted in a tank with a sloped top surface.

11. The improved ultrasonic fluid level sensor of claim 1 further comprising an electronic control system, the control system comprising a transducer port connectable to the transducer and an output port connectable to the fluid level indicator.

12. The improved ultrasonic fluid level sensor of claim 11, wherein the transducer is electrically connected to the transducer port via a first electrical connection.

13. The improved ultrasonic fluid level sensor of claim 11, wherein the fluid level indicator is connected to the output port via a second electrical connection.

14. The improved ultrasonic fluid level sensor of claim 13, wherein the output port emulates a variable resistor.

15. The improved ultrasonic fluid level sensor of claim 1, wherein the tank further comprises a watercraft fuel tank.

16. The improved ultrasonic fluid level sensor of claim 1, wherein the tank further comprises a recreational vehicle fuel tank.

17. The improved ultrasonic fluid level sensor of claim 1, wherein the tank further comprises an aircraft fuel tank.

18. The improved ultrasonic fluid level sensor of claim 1, wherein the fluid level indicator further comprises an electric fuel gauge having reference indicators indicating the tank is one quarter full, the tank is one half full, and the tank is three quarters full.

19. In a fluid tank wherein said tank is susceptible to movement, and wherein a calibration fluid level in said tank is known, an improved ultrasonic fluid level sensor comprising:
a vertically mounted stillwell means functioning to provide a sheltered measuring environment in said tank;
said stillwell means having a hole means functioning to provide communication between a tank fluid level and a stillwell means fluid level;
an ultrasonic transducer means functioning to inject and receive an ultrasonic signal;
wherein a fluid level indicator means functioning to display a fuel level is set at the known calibration fluid level and a calibration signal is sent from the transducer means to the known fluid level and back to the transducer means, thereby creating a reference time measurement of the calibration signal which corresponds to the fluid level indicator setting; and
wherein subsequent variations in the fluid level are indicated on the fluid level indicator means in a predetermined relationship with subsequent reference time measurements.

20. A method of calibrating an ultrasonic fluid level measuring system comprising a stillwell having an ultrasonic transducer operated by a control system, and wherein a calibration fluid level within a tank is known, the method comprising the steps of:
setting a fluid level indicator to the known calibration fluid level;
sending a calibration signal from the transducer to the known calibration fluid level and back to the transducer, thereby creating a reference time measurement of the calibration signal which corresponds to the fluid level indicator setting; and
determining a relationship between subsequent reference time measurements and subsequent fluid levels via a relationship between the reference time measurement and the known fluid level.

21. In a fluid tank wherein a calibration fluid level in said tank is known, an improved ultrasonic fluid level sensor comprising:
a stillwell having a vertical mount in said tank;
said stillwell having a segment extending above a maximum level of said fluid;
said stillwell having a hole at a bottom segment to provide a fluid communication between a tank fluid level and a stillwell fluid level;
an ultrasonic transducer mounted in said stillwell;
wherein a fluid level indicator is set at the known calibration fluid level and a calibration signal is sent from the transducer to the known calibration fluid level and back to the transducer, thereby creating a reference time measurement of the calibration signal which corresponds to the fluid level indicator setting; and
wherein subsequent variations in the fluid level are indicated on the fluid level indicator in a predetermined relationship with subsequent reference time measurements.

* * * * *